(12) United States Patent
Tanaka et al.

(10) Patent No.: US 9,120,531 B2
(45) Date of Patent: Sep. 1, 2015

(54) MOTOR DRIVING CONTROL APPARATUS

(75) Inventors: Masato Tanaka, Tokyo (JP); Kazuo Asanuma, Tokyo (JP); Yasuo Hosaka, Tokyo (JP)

(73) Assignees: MICROSPACE CORPORATION, Tokyo (JP); TAIYO YUDEN CO., LTD., Tokyo (JP)

( * ) Notice: Subject to any disclaimer, the term of this patent is extended or adjusted under 35 U.S.C. 154(b) by 116 days.

(21) Appl. No.: 13/995,769

(22) PCT Filed: Dec. 13, 2011

(86) PCT No.: PCT/JP2011/078760
§ 371 (c)(1),
(2), (4) Date: Oct. 3, 2013

(87) PCT Pub. No.: WO2012/086458
PCT Pub. Date: Jun. 28, 2012

(65) Prior Publication Data
US 2014/0039741 A1     Feb. 6, 2014

(30) Foreign Application Priority Data
Dec. 22, 2010    (JP) ................................ 2010-285549

(51) Int. Cl.
*B62M 6/45*      (2010.01)
*B60L 11/00*     (2006.01)
(Continued)

(52) U.S. Cl.
CPC ................ *B62M 6/45* (2013.01); *B60L 11/007* (2013.01); *B60L 15/20* (2013.01); *B62M 6/50* (2013.01); *B60L 2200/24* (2013.01); *Y02T 10/7275* (2013.01)

(58) Field of Classification Search
CPC ....................................................... B62M 6/45
USPC .................................................. 701/22, 57, 93
See application file for complete search history.

(56) References Cited

U.S. PATENT DOCUMENTS 5,375,676 A * 12/1994 Takata et al. ................ 180/206.4
5,662,187 A * 9/1997 McGovern ................. 180/206.6
(Continued)

FOREIGN PATENT DOCUMENTS

EP           0697332      5/1997
JP           63-314018    12/1988
(Continued)

OTHER PUBLICATIONS

Extended European Search Report mailed Apr. 3, 2014 in corresponding European Patent Application No. 11851554.3.
(Continued)

*Primary Examiner* — Mary Cheung
*Assistant Examiner* — Michael Berns
(74) *Attorney, Agent, or Firm* — Staas & Halsey LLP

(57) ABSTRACT

This motor driving control apparatus includes: a smoothing processing unit that executes smoothing processing using values of pedal input torque at plural points to calculate a first smoothed torque value; an insufficiency output unit that obtains a rate of points at which input of the pedal input torque is insufficient among the plural points; an assist torque calculating unit that performs calculation processing of mixing the first torque value calculated by the smoothing processing unit and the pedal input torque in accordance with output of the insufficient output unit to calculate assist torque; and a driving processing unit that performs processing to drive a motor using the assist torque calculated by the assist torque calculating unit.

26 Claims, 14 Drawing Sheets

(51) Int. Cl.
  *B60L 15/20* (2006.01)
  *B62M 6/50* (2010.01)

(56) References Cited

U.S. PATENT DOCUMENTS

| | | | |
|---|---|---|---|
| 5,922,035 A * | 7/1999 | Chen | 701/22 |
| 5,937,962 A * | 8/1999 | Yokoyama | 180/205.4 |
| 5,971,090 A | 10/1999 | Tanaka et al. | |
| 6,580,235 B2 | 6/2003 | Laurent | |
| 6,714,849 B1 * | 3/2004 | Ferrero | 701/51 |
| 8,311,623 B2 * | 11/2012 | Sanger | 600/546 |
| 2002/0008489 A1 | 1/2002 | Laurent | |
| 2005/0177285 A1* | 8/2005 | Honda | 701/22 |
| 2009/0209878 A1* | 8/2009 | Sanger | 600/546 |
| 2011/0127933 A1 | 6/2011 | Shimada et al. | |

FOREIGN PATENT DOCUMENTS

| | | |
|---|---|---|
| JP | 6-255564 | 9/1994 |
| JP | 8-58668 | 3/1996 |
| JP | 8-80891 | 3/1996 |
| JP | 8-295285 | 11/1996 |
| JP | 9-60547 | 3/1997 |
| JP | 10-59260 | 3/1998 |
| JP | 10-59262 | 3/1998 |
| JP | 10-114292 | 5/1998 |
| JP | 11-79062 | 3/1999 |
| JP | 11-227438 | 8/1999 |
| JP | 11-348867 | 12/1999 |
| JP | 2000-118479 | 4/2000 |
| JP | 3301811 | 4/2002 |
| JP | 3955152 | 5/2007 |
| JP | 2007-282300 | 10/2007 |
| JP | 2008-236906 | 10/2008 |

OTHER PUBLICATIONS

PCT International Preliminary Report on Patentability mailed Jul. 4, 2013 in corresponding International Application No. PCT/JP2011/078761.

PCT International Preliminary Report on Patentability mailed Jul. 11, 2013 in corresponding International Application No. PCT/JP2011/078760.

Office Action mailed Jan. 16, 2015 for corresponding U.S. Appl. No. 13/996,418.

International Search Report mailed Mar. 19, 2012 in corresponding International Application No. PCT/JP2011/078760.

* cited by examiner

MOTOR DRIVING CONTROL APPARATUS

CROSS-REFERENCE TO RELATED APPLICATIONS

This application is a U.S. national stage application of PCT/JP2011/078760 filed Dec. 13, 2011 and claims foreign priority benefit of Japanese Application No. 2010-285549 filed Dec. 22, 2010 in the Japanese Intellectual Property Office, the contents of both of which are incorporated herein by reference.

TECHNICAL FIELD

The present invention relates to motor driving control.

BACKGROUND TECHNOLOGY

With an electrically assisted bicycle for example, a motor is driven in accordance with a pedal pedaling force and an assist ratio that has been set beforehand. In a simple example, there are cases where assist torque, obtained by multiplying a pedal input torque corresponding to pedal pedaling force by an assist ratio according to pedal pedaling force. However, control is also performed to gradually reduce the assist ratio in accordance with vehicle speed when a predetermined vehicle speed or higher is reached, in order to prevent the assist from suddenly cutting out in cases where using the assist for high-speed riding is legally forbidden.

FIG. 1 illustrates change over time of assist torque in a case of simply multiplying pedal pedaling force by assist ratio. In FIG. 1, the dotted line represents the pedal input torque, and the solid line represents the assist torque obtained by multiplying this pedal input torque by the assist ratio corresponding to the pedal pedaling force. Thus, since the pedal input torque is input in an undulated form, the assist torque is also an undulated form if just multiplied by an assist ratio according to the pedaling force. In such a case, the assist is weak at points where pedal pedaling force cannot be applied, so the sensation of assistance is not good. Also, the assist torque is temporarily great, the peak of the motor driving current is also great, so this is driving with greater loss from the perspective of electric efficiency, as well.

Note that Japanese Patent No. 3955152 discloses a technology in which riding and driving can be performed with an optimal assist ratio constantly being decided, in speedy following response to change in riding environment and change in detected manpower driving force, whereby natural and smooth riding can be realized without giving the operator an unnatural sensation regarding the comfort of the ride of the vehicle. Specifically, a control device of a vehicle with an assisting driving device is a control device of a vehicle with an assisting driving device which provides a vehicle driving unit for performing driving with manpower driving force which pulsates in accordance with rotational operation of a pedal crank and assisting power from an assisting force driving unit, the control device including a detecting unit for detecting manpower driving force; a calculating unit for calculating the amount of work due to the manpower driving force during a period where the detected manpower driving force is at or above a threshold value for restricting assisting force; a correcting unit for obtaining assisting force by, after a point where the manpower driving force is at or below the threshold value, correcting the output current corresponding to the detected manpower driving force, so as to obtain assisting force; and a control unit for effecting control so as to output the corrected assisting force. With such control, there is a problem in that restriction is applied even at the point of starting to pedal, when great torque is desired.

Further, Japanese Unexamined Patent Application Publication 8-295285 describes technology for improving drivability when climbing hills and the like. Specifically, in a case of configuring a driving device for a power assisted vehicle including a manpower driving mechanism for driving a wheel by pedal pedaling force, and an assisting driving mechanism which provides assisting driving force corresponding to the magnitude of the pedaling force to the wheel, included are a pedaling cycle detecting unit for detecting a cycle tn (t1 through t5) of the pedal pedaling force, and a delay time control unit which makes a provided delay time of the assisting driving force (tn*constant C) to be proportionate to the pedaling force cycle tn. According to this technology, providing of the assisting driving force is delayed such that the time of the maximum assisting driving force approximates the minimum pedaling force, so a uniform and constant combined force can be supplied wherein the valleys in pedaling force have been supplemented by assisting driving force. Accordingly, fluctuations in the combined force is suppressed, the loss in speed due to values in combined force when climbing hills and so forth is reduced, and stable riding can be achieved. However, the assisting driving force is added in a delayed manner, and accordingly cannot handle starting from a stopped state. In the same way, cases other than cases where great assistance is necessary, such as when climbing hills and so forth, cannot be suitably handled.

Further, Japanese Patent No. 3301811 discloses technology for increasing the amount of electricity which the battery can discharge in a case of controlling motor output in accordance with pedaling force, so as to extend the battery life. Specifically, a bicycle with an electric motor, in which output of an electric driving system is controlled in accordance with change in human pedaling force, includes a pedaling force detecting unit for detecting pedaling force, a motor output calculating unit, configured of a CPU, for deciding constant electric motor output over a next cycle, based on measured values of pedaling force within one cycle obtained each predetermined time dt, and an output control unit configured to generate the obtained motor output. However, in the case of performing processing every predetermined time, suitable assistance which tracks fluctuating medal pedaling force cycles is not necessarily performable.

PRIOR TECHNICAL DOCUMENTS

Patent Documents

Patent Document 1: Japanese Patent No. 3301811
Patent Document 2: Japanese Laid-open Patent Publication No. 8-295285
Patent Document 3: Japanese Patent No. 3955152

SUMMARY OF THE INVENTION

Object to be Solved by the Invention

Accordingly, it is an object of the present invention to provide a technology enabling sufficient assistance when starting pedaling an electrically assisted bicycle from a stop.

It is another object of the present invention to provide a technology enabling suitable target torque calculation tracking torque requests with varying cycles.

Means for Solving the Problem

A motor driving control apparatus according to a first mode of the present invention includes (A) a smoothing processing unit that execute smoothing processing using values of pedal input torque at plural points to calculate a first smoothed torque value; (B) an insufficiency output unit that obtains a rate of points at which input of the pedal input torque is insufficient among the plural of points; (C) an assist torque calculating unit that performs calculation processing of mixing the first smoothed torque value calculated by the smoothing processing unit and the pedal input torque in accordance with output of the insufficient output unit to calculate assist torque; and (D) a driving processing unit that performs processing to drive a motor using the assist torque calculated by the assist torque calculating unit.

The rate is a high value at the time of starting out the pedaling or the like, and consequently a great rate of the pedal input torque is added to the first smoothed torque value, so sufficient assistance is enabled at the time of starting out the pedaling or the like.

The aforementioned smoothing processing unit may include a filter that calculates a moving average or weighted moving average of the values of the pedal input torque at the plural points within a variable period corresponding to one cycle (including, in addition to one cycle, a case of approximately one cycle) of the pedal input torque whose cycle is variable as the first smoothed torque value. Thus, the smoothed torque value can be calculated suitably tracking the pedal input torque of the variable cycle.

Further, the filter may be a FIR (Finite Impulse Response) filter. In this case, values of tap coefficients of the FIR filter, which correspond to both edge portions of the variable period, may be set so as to smoothly change to values of tap coefficients, which correspond to other portions of the variable period. Even in the event that synchronization with the pedal input torque is somewhat off, a suitable first smoothed torque value can be calculated.

Further, the aforementioned assist torque calculating unit may include a torque adding unit that performs addition of the first smoothed torque value, which is an addition result of the first smoothing torque value and a value calculated by multiplying the pedal input torque by the rate outputted by the insufficiency output unit, and the value of the pedal input torque, with weighting with a positive or negative arbitrary smoothing coefficient value. By introducing such a torque adding unit, it becomes possible to calculate suitable assist torque values according to various situations.

Also, the aforementioned assist torque calculating unit may include a torque adding unit for calculating an inverse ripple torque by subtracting a value of the pedal input torque from a second smoothed torque value, which is an addition result of the first smoothed torque value and a value calculated by multiplying the pedal input torque by the rate outputted by the insufficiency output unit, multiplies the inverse ripple torque by a positive or negative arbitrary smoothing coefficient value, and adds a result of the multiplying and the second smoothed torque value. By also employing such an implementation method, it is possible to calculate the suitable assist torque value according to various situations.

The smoothing coefficient value may be set so as to increase as an assist ratio being set rises.

A motor driving control device according to a second mode of the present invention includes (A) a smoothing processing unit that calculates, for a period corresponding to a cycle of torque request whose cycle is variable, a moving average or weighted moving average of the torque request; (B) a calculating unit that performs calculation processing using a processing result of the smoothing processing unit and the torque request to calculate a target torque corresponding to the torque request, and (C) a driving processing unit that performs processing to drive a motor using the target torque calculated by the calculating unit.

By suitably smoothing the torque request while following phase transition of the torque request whose cycle is variable, and further calculating the target torque using the torque request, it becomes possible to perform suitable motor driving as to the torque request. Note that the smoothing processing unit may change the sampling timing of the torque request in accordance with pulse signals that are generated in accordance with rotations of the motor.

Note that the aforementioned smoothing processing unit may be a FIR filter. In this case, values of tap coefficients for the FIR filter, which correspond to both edge portions of the variable period, may be set so as to smoothly change to values of tap coefficients, which correspond to other portions of the variable period. Thus, it becomes possible to perform suitable smoothing even in a case where phase transition of the torque request in the variable cycle cannot be completely tracked.

Further, the smoothing processing unit may be a FIR filter. In this case, the aforementioned calculating unit may include an insufficiency calculating unit that calculates a rate of the torque requests whose value inputted to the FIR filter is zero; and a smoothed torque calculating unit that mixes an output of the FIR filter and the value of the torque request, in accordance with the rate to calculate a smoothed torque value. Thus, even in a state where the torque request is not sufficiently input yet, such as at the time of starting out the pedaling, sufficiently great target torque is outputted in the event that the torque request value is great.

Also, the aforementioned calculating unit may include a torque adding unit that performs addition of a processing result of the smoothing processing unit and the value of the torque request with weighting a positive or negative arbitrary smoothing coefficient value. Thus, it becomes possible to set suitable target torque in accordance with various situations.

Also, the aforementioned calculating unit may include a torque adding unit that calculates an inverse ripple torque by subtracting the value of the torque request from a processing result of the smoothing processing unit, multiplies the inverse ripple torque by a positive or negative arbitrary smoothing coefficient value, and adds a processing result of the multiplying and the smoothed torque value or a value obtained by multiplying the smoothed torque value by a predetermined value. With such an implementation method, it is possible to set suitable assist torque values according to various situations.

Further, the motor driving control apparatus according to the second mode may further include a detector that detects a lower side envelope of a vehicle speed which changes over time; and a determining unit for determines the coefficient value in accordance with the value of the lower side envelope detected by the detector. Because it is possible to grasp the driving state by the level of the lower side envelope of the vehicle speed, it becomes possible to calculate suitable target torque value according to the various situations, when determining a coefficient value according to the driving state.

Further, the motor driving control apparatus according to the second mode may further include a detector that detects a lower side envelope and an upper side envelope of a vehicle speed which changes over time; and a determining unit that determines the aforementioned coefficient value in accordance with value of the lower side envelope and the upper side envelope, which are detected by the detector. When not only the lower side envelope but also the upper side envelope are used, it is possible to grasp further suitable situations, and also calculate suitable target torque accordingly.

Also, the motor driving control apparatus according to the second mode may include a detector that detects a lower side envelope of a vehicle speed which changes over time; and a determining unit that determines at least one of the smoothing coefficient value and the predetermined value, in accordance with the value of the lower side envelope detected by the detector.

Further, the motor driving control apparatus according to the second mode may include a detector that detects a lower side envelope and an upper side envelope of a vehicle speed which changes over time; and a determining unit that determines at least one of the smoothing coefficient value and the predetermined value in accordance with value of the lower side envelope and upper side envelope, which are detected by the detector.

Further, a program to execute the previously described processing using a microprocessor may be created, and the program is stored on a computer-readable recording medium or recording device such as, for example, a flexible disk, an optical disc such as a CD-ROM, a magneto-optical disc, semiconductor memory (ROM for example), or a hard disk. Further, the data during the processing may be temporarily held in a storage device such as RAM (Random Access Memory) or the like.

Effect of the Invention

According to the present invention, sufficient assistance can be realized at the time of starting out and so forth with an electrically assisted bicycle.

Also, according to another aspect of the present invention, suitable target torque can be calculated, tracking torque request of which the cycle is variable.

MODE FOR CARRYING OUT THE INVENTION

Figure 1:
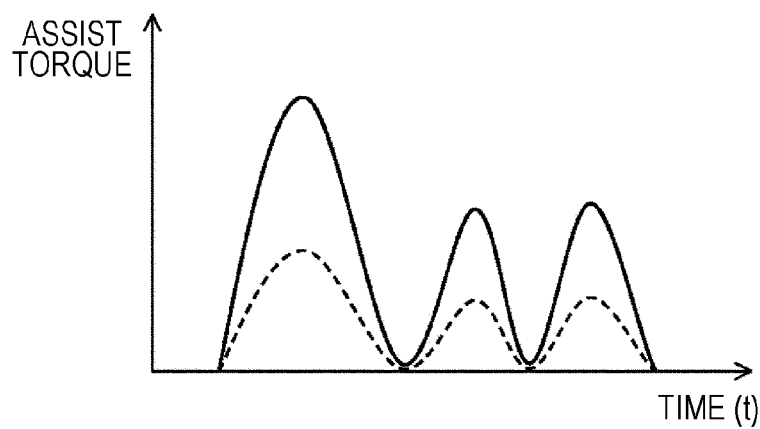
FIG. 1 is a diagram for describing conventional art.
Figure 2:
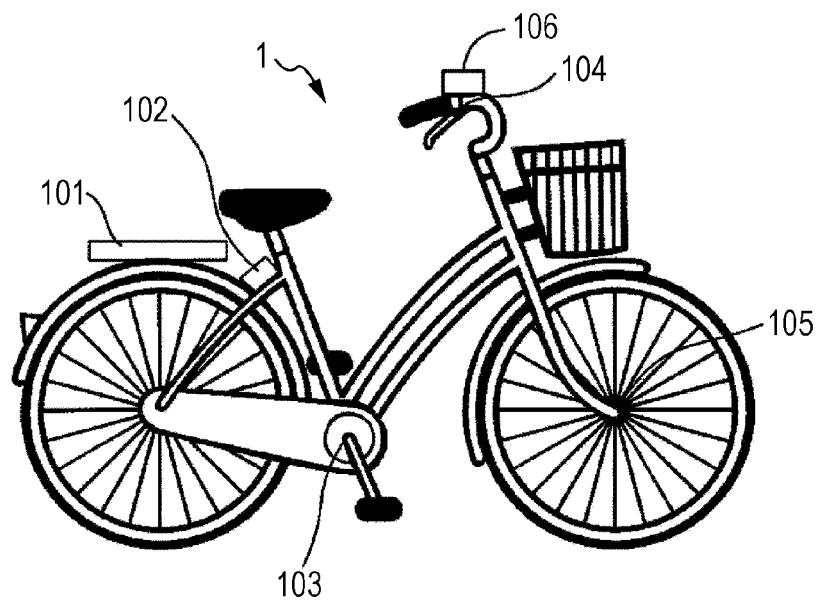
FIG. 2 is a diagram illustrating an example of an electrically assisted bicycle.

FIG. 2 is an external view illustrating an example of an electrically assisted bicycle related to the third Embodiment. The electrically assisted bicycle 1 is typical rear wheel drive type with a crankshaft and a rear wheel connected by a chain, and has a motor drive device installed. The motor drive device includes a secondary battery 101, a motor drive control mechanism 102, a torque sensor 103, a brake sensor 104, a motor 105, and an operation panel 106.

The secondary battery 101 may be, for example, a lithium ion secondary battery with a maximum supply voltage of 24 V (when fully charged), but other types of batteries such as a lithium ion polymer secondary battery, or a nickel hydride chargeable battery may be used.

The torque sensor 103 is provisioned on the wheel which is installed on the crankshaft, detects pedal force from the rider, and this detection result is output to the motor drive control mechanism 102.

The brake sensor 104 is configured from a magnet and a common lead switch. The magnet is fixed to a brake wire connected to a brake lever in housing to which the brake lever is fixed and the brake wire transmits. The brake lever changes the lead switch to an on state when gripped by hand. Also, the lead switch is fixed to the housing. A conduction signal from this lead switch is sent to the motor drive control mechanism 102.

The motor 105 is, for example, a common three-phase direct current brushless motor, and mounted on the front wheel of the electrically assisted bicycle 1. The motor 105 rotates the front wheel, and also a rotor is connected to the front so as to rotate corresponding to the rotation of the front wheel. Further, the motor 105 is equipped with a rotation sensor such as a hall effect sensor to output rotation information of the rotor (i.e., a hall signal) to the motor drive control mechanism 102.

The operation panel 106 receives instruction input related to the presence of assist, and outputs the applicable instruction input to the motor drive control mechanism 102. Further, the operation panel 106 may receive assist ratio setting input from the user, and output the applicable setting input to the motor drive control mechanism 102.

Figure 3:
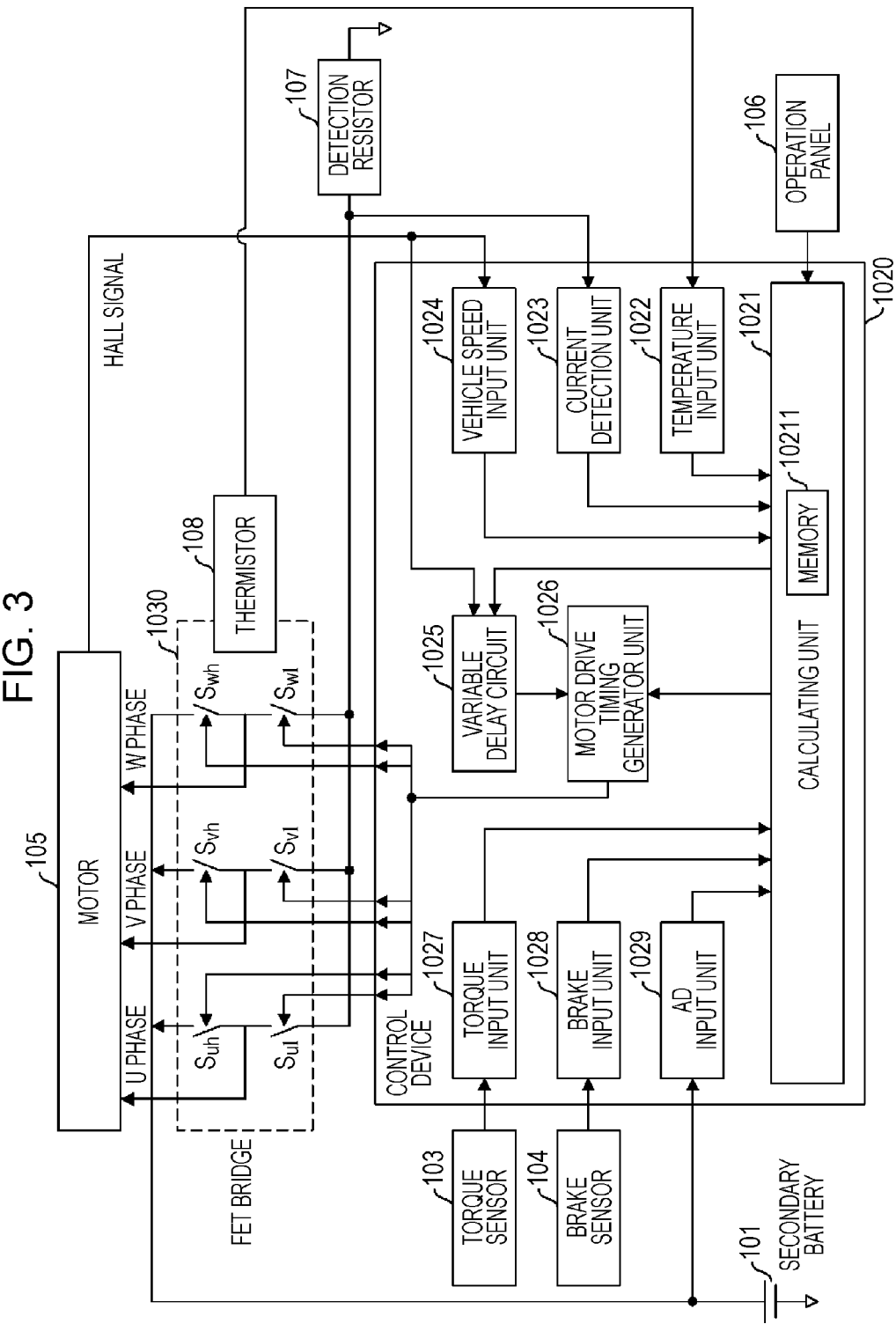
FIG. 3 is a functional block diagram associated with a motor drive control instrument related to the third Embodiment.

FIG. 3 illustrates a configuration related to the motor drive control mechanism 102 of this kind of electrically assisted bicycle 1. The motor drive control mechanism 102 includes a control mechanism 1020, and an FET (Field Effect Transistor) bridge 1030. The FET bridge 1030 includes a high side FET ($S_{uh}$) and a low side FET ($S_{ul}$) to perform switching of a U phase of the motor 105, a high side FET ($S_{vh}$) and a low side FET ($S_{vl}$) to perform switching of a V phase of the motor 105, and a high side FET ($S_{wh}$) and a low side FET ($S_{wl}$) to perform switching of a W phase of the motor 105. This FET bridge 1030 is configured as a portion of the complementary type switching amplifier. Also, a thermistor 108 for measuring temperature is provisioned in the FET bridge 1030.

Also, the control mechanism 1020 includes a calculating unit 1021, a temperature input unit 1022, a current detection unit 1023, a vehicle speed input unit 1024, a variable delay circuit 1025, a motor drive timing generator 1026, a torque input unit 1027, a brake input unit 1028, and an AD input unit 1029.

The calculating unit 1021 performs calculations described later using input from the operation panel 106 (i.e., on/off or operation mode such as an assist ratio), input from the temperature input unit 1022, input from the current detection unit 1023, input from the vehicle speed input unit 1024, input from the torque input unit 1027, input from the brake input unit 1028, and input from the AD input unit 1029, and performs an output to the motor drive timing generator unit 1026 and the variable delay circuit 1025. Further, the calculating unit 1021 includes a memory 10211, and the memory 10211 stores various data used in calculations, data currently in processing, and other data. Further, the calculating unit 1021 may be realized by executing a program with a processor, and in this case the applicable program may be stored in the memory 10211.

The temperature input unit 1022 digitizes the input from the thermistor 108, and outputs this to the calculating unit 1021. The current detection unit 1023 digitizes voltage values corresponding to current via a detection resistor 107 that detects current flowing to the FETs in the FET bridge 1030, and outputs this to the calculating unit 1021. The vehicle input unit 1024 calculates the current speed from the hall signal output by the motor 105, and outputs this to the calculating unit 1021. The torque input unit 1027 digitizes the signal equivalent to the pedal effort from the torque sensor 103, and outputs this to the calculating unit 1021. The brake input unit 1028 digitizes the signal equivalent to the brake input from the brake sensor 104, and outputs this to the calculating unit 1021. The AD (Analog-Digital) input unit 1029 digitizes the output voltage from the secondary battery 101, and outputs this to the calculating unit 1021. Also, the memory 10211 may be provisioned separately from the calculating unit 1021.

The calculating unit 1021 outputs an advance value, which is the calculating result, to the variable delay circuit 1025. The variable delay circuit 1025 adjusts the phase of the hall signal based on the advance value received from the calculating unit 1021, and outputs this to the motor drive timing generator unit 1026. The calculating unit 1021 outputs a PWM code equivalent to the PWM duty cycle, for example, to the motor drive timing generator unit 1026. The motor drive timing generator unit 1026 generates switching signals and outputs these to each FET included in the FET bridge 1030, based on the hall signal after adjustment from the variable delay circuit 1025 and the PWM code from the calculating unit 1021.

Figure 4:
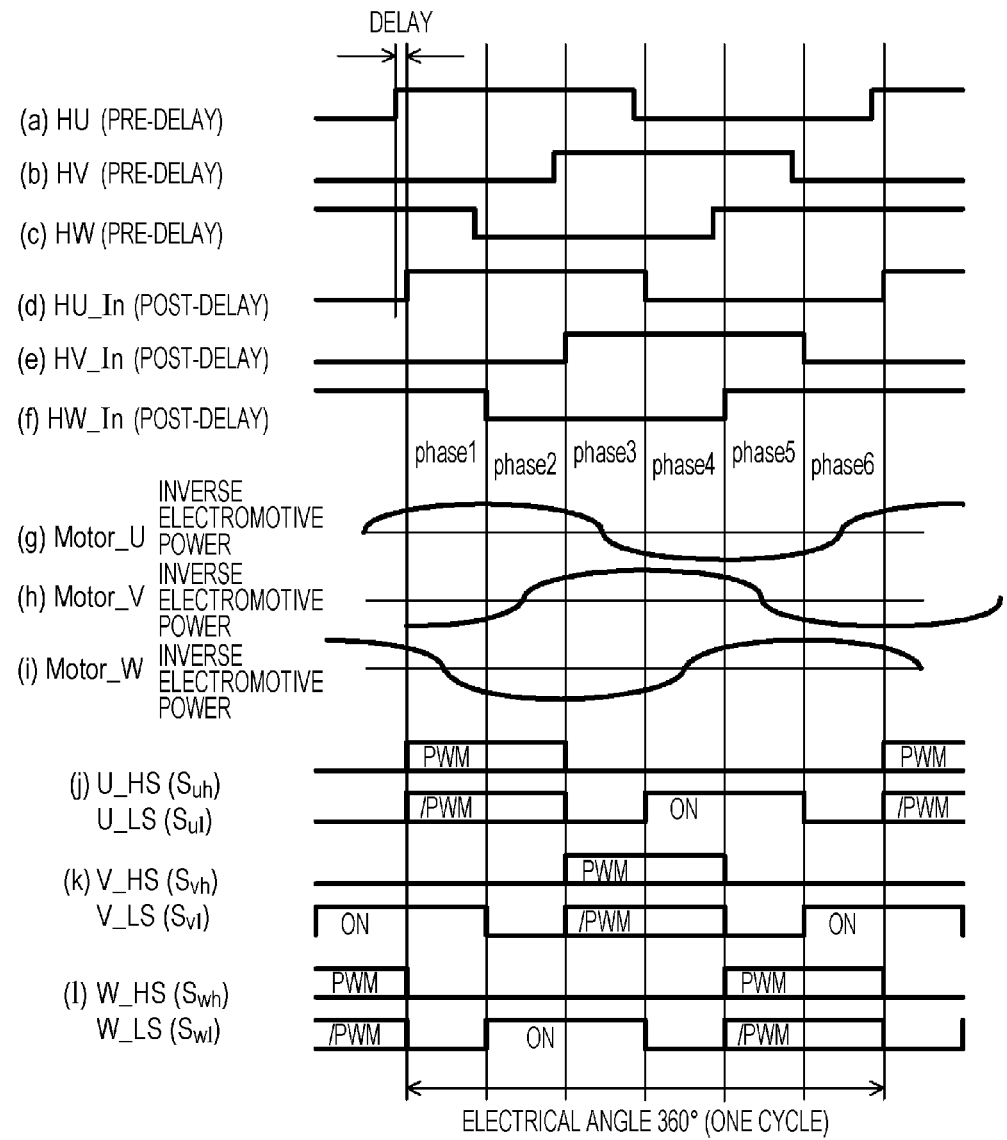
FIG. 4(a) through (l) are waveform diagrams describing basic operation of a motor drive.

The basic operation of the motor drive configured as illustrated in FIG. 3 will be described using FIG. 4(*a*) through (*l*). FIG. 4(*a*) illustrates the hall signal HU for the U phase output by the motor 105, FIG. 4(*b*) illustrates the hall signal HV for the V phase output by the motor 105, and FIG. 4(*c*) illustrates the hall signal HW for the W phase output by the motor 105. As will be described later, according to the present embodiment, the hall effect sensor of the motor 105 is set so that the hall signal is output at a phase slightly ahead as illustrated in FIG. 4 so that it may be adjusted by the variable delay circuit 1025. Therefore, as illustrated in FIG. 4(*d*), a hall signal HU_In for the U phase after adjustment is output from the variable delay circuit 1025 to the motor drive timing generator unit 1026, and as illustrated in FIG. 4(*e*), a hall signal HV_In for the V phase after adjustment is output from the variable delay circuit 1025 to the motor drive timing generator unit 1026, and as illustrated in FIG. 4(*f*), a hall signal HW_In for the W phase after adjustment is output from the variable delay circuit 1025 to the motor drive timing generator unit 1026.

Further, a hall signal cycle 1, as a 360 degree electrical angle, is divided into 6 phases.

Also, as illustrated in FIG. 4(*g*) through (*i*), a Motor_U inverse electromotive force is generated by a terminal for the U phase, a Motor_V inverse electromotive force is generated by a terminal for the V phase, and a Motor_W inverse electromotive force is generated by a terminal for the W phase, all of which are so-called inverse electromotive force voltages. As Illustrated in FIG. 4(*j*) through (*l*), switching signals are output to a gate of each FET in the FET bridge 1030 to drive the motor 105 by applying the drive voltage after adjusting the phase to this kind of motor inverse electromotive force voltage. U_HS in FIG. 4(*j*) represents the gate signal of the high side FET ($S_{uh}$) for the U phase, and U_LS in FIG. 4(*j*) represents the gate signal of the low side FET ($S_{ul}$) for the U phase. PWM and /PWM represent the period to be turned on/off by the duty cycle corresponding to the PWM code, which is the calculation result from the calculating unit 1021, and as this is a complementary type, when the PWM is on, /PWM is off, and when PWM is off, /PWM is on. The on interval for the low side FET ($S_{ul}$) is always on. V_HS in FIG. 4(*k*) represents the gate signal of the high side FET ($S_{vh}$) for the V phase, and V_LS represents the gate signal of the low side FET ($S_{vl}$) for the V phase. The signals have the same meaning as those in FIG. 4(*j*). Further, W_HS in FIG. 4(*l*) represents the gate signal of the high side FET ($S_{wh}$) for the W phase, and W_LS in represents the gate signal of the low side FET ($S_{wl}$) for the W phase. The signals have the same meaning as those in FIG. 4(*j*).

In this way, the U phase FET ($S_{uh}$ and $S_{ul}$) are a first phase and a second phase performed by PWM switching, and the U phase of the low side FET ($S_{ul}$) is turned on by a fourth phase and a fifth phase. Also, the V phase FET ($S_{vh}$ and $S_{vl}$) are a third phase and a fourth phase performed by PWM switching, and the V phase of the low side FET ($S_{vl}$) is turned on by a sixth phase and the first phase. Also, the W phase FET ($S_{wh}$ and $S_{wl}$) are the fifth phase and the sixth phase performed by PWM switching, and the W phase of the low side FET ($S_{wl}$) is turned on by the second phase and the third phase.

By outputting such signals and controlling the duty cycle to a preferable state, the motor 105 may be driven at the desired torque.

Figure 5:
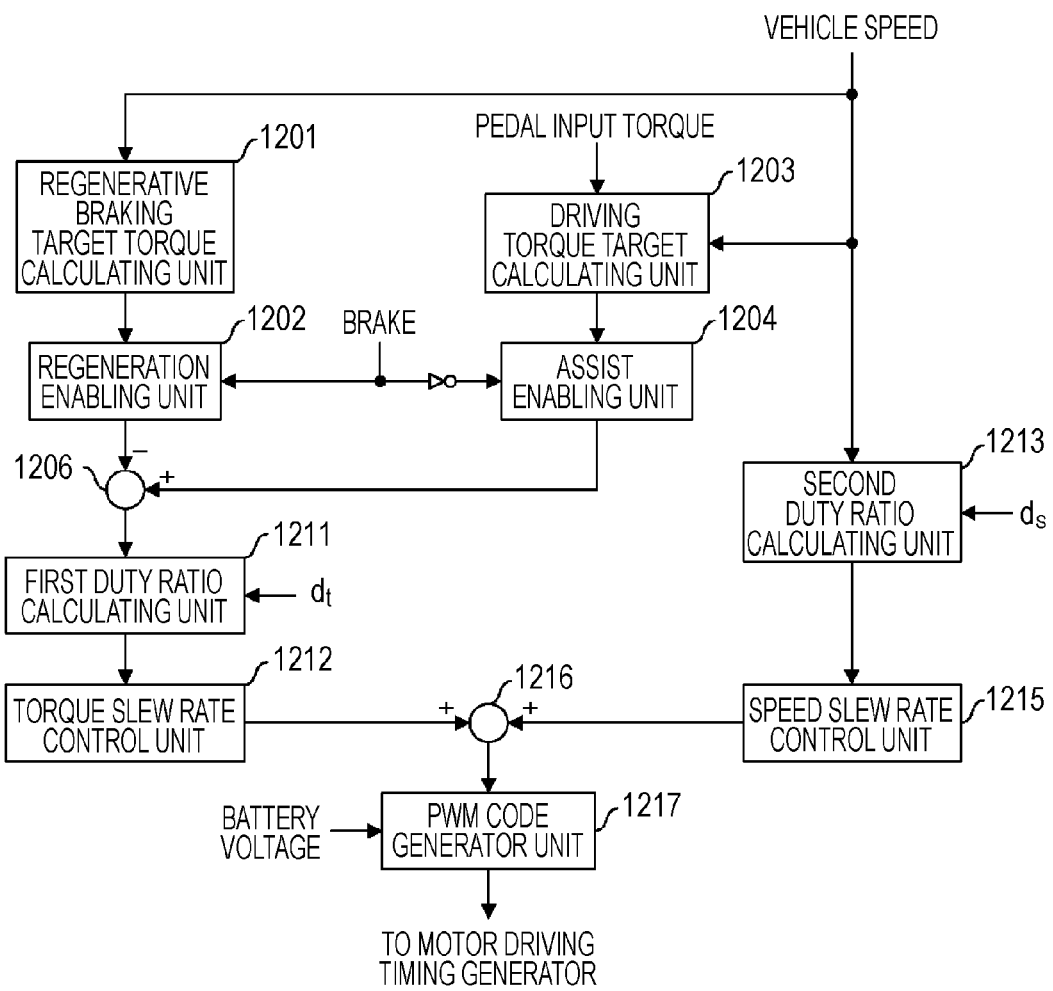
FIG. 5 is a functional block diagram of a calculating unit.

Next, FIG. 5 is a functional block diagram of the calculating unit 1021. The calculating unit 1021 includes a regenerative brake target torque calculating unit 1201, a regeneration enabling unit 1202, a drive torque target calculating unit 1203, an assist enabling unit 1204, an adding unit 1206, a first duty cycle conversion unit 1211, a torque slew rate restricting unit 1212, a second duty cycle conversion unit 1213, a speed slew rate restricting unit 1215, a calculating unit 1216, and a PWM code generator unit 1217.

The vehicle speed value from the vehicle speed input unit 1024 and the pedal torque value from the torque input unit 1027 are input into the drive torque target calculating unit 1203, where the assist torque value is calculated. The calculation content of the drive torque target calculating unit 1203 will be described later in detail.

Also, the regenerative brake target torque calculating unit 1201 calculates the regenerative brake target torque value according to a preset curve, for example, in accordance with the vehicle speed value from the vehicle speed input unit 1024. This curve is a curve representing a relation a value which is of inverse polarity and is an absolute value less than or half of the first value (less than or half could also mean, for example, a few percentage points over half the value). This enables the performance of a reasonably efficient regeneration at any speed. This processing is not the primary purport of the present embodiment, so further description will be omitted.

According to the present embodiment, when an input signal signifying that the brake is present is input from the brake input unit 1028, the regeneration enabling unit 1202 outputs the regeneration target torque value from the regenerative brake target torque calculating unit 1201 to the adding unit 1206. In any other case, a zero is output. In contrast, when an input signal signifying that the brake is not present is input from the brake input unit 1208, the assist enabling unit 1204 outputs the assist torque value from the drive torque target calculating unit 1203. In any other case, a zero is output.

The adding unit 1206 inverses the polarity of and outputs the regeneration target torque value from the regeneration enabling unit 1202, or outputs the polarity of the assist torque value from the assist enabling unit 1204 as it is. The description below will refer to both the assist torque value and the regeneration target torque value as the target torque value for simplification of the description.

The first duty cycle conversion unit 1211 calculates a torque duty code by multiplying the output from the adding unit 1206 with the conversion coefficient $d_t$, and outputs this to the torque slew rate restricting unit 1212. The torque slew rate restricting unit 1212 executes a well-known slew rate restriction processing on the output from the first duty cycle conversion unit 1211, and outputs the processing result to the adding unit 1216.

Also, the second duty cycle conversion unit 1213 calculates the vehicle speed duty code by multiplying the vehicle speed value with the adjusted conversion coefficient $d_s$, and outputs this to the speed slew rate restricting unit 1215. The speed slew rate restricting unit 1215 executes a well-known slew rate control processing on the output from the second duty cycle conversion unit 1213, and outputs the processing result to the adding unit 1216.

The adding unit 1216 adds the torque duty code from the torque slew rate restricting unit 1212 and the vehicle speed duty code from the speed slew rate restricting unit 1215, calculates the duty code, and outputs this to the PWM code generator unit 1217. The PWM code generator 1217 generates the PWM code by multiplying the duty code with the value of the battery voltage from the AD input unit 1029 divided by the reference voltage (for example, 24 V). The PWM code is output to the motor drive timing generator unit 1026.

Figure 6:
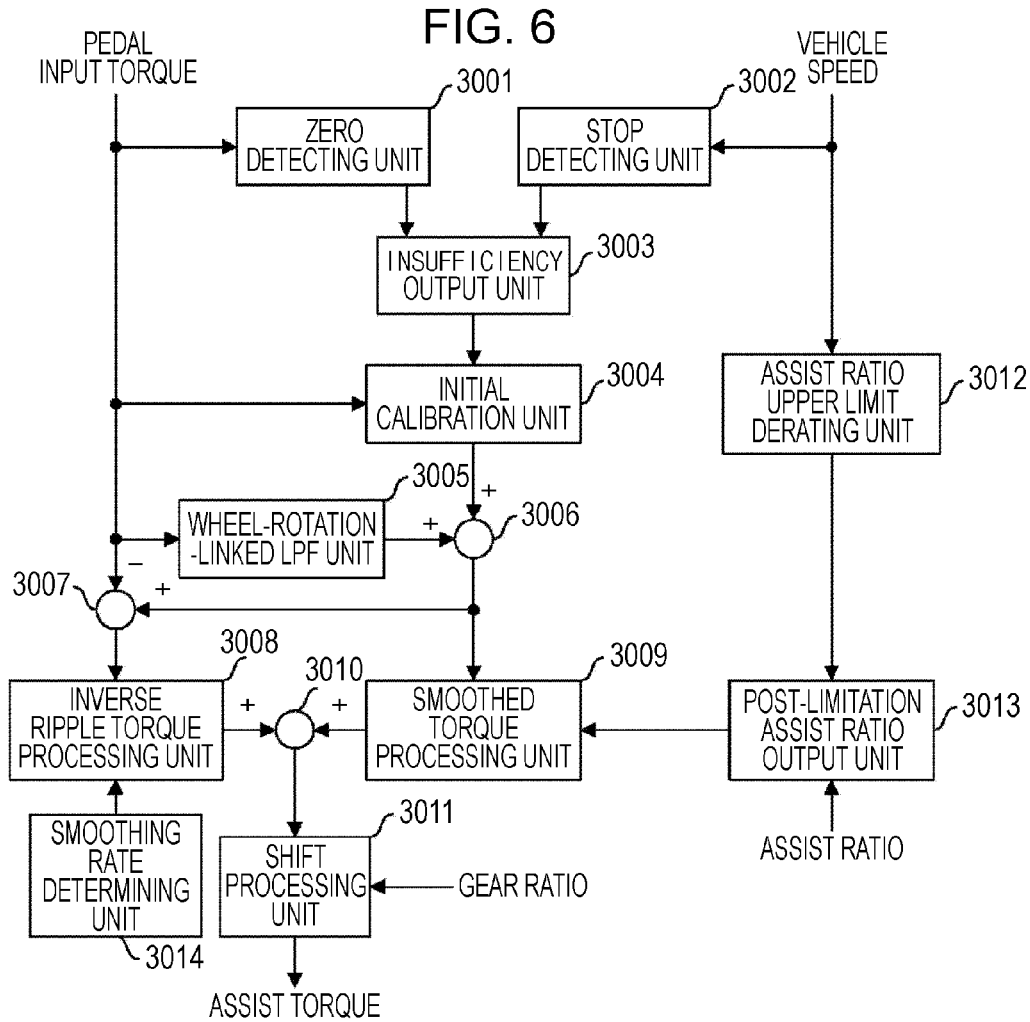
FIG. 6 is a functional block diagram of a driving torque target calculating unit.

The drive torque target calculating unit 1203 according to the present embodiment has a configuration such as illustrated in FIG. 6, for example. That is to say, the drive torque target calculating unit 1203 includes a zero detecting unit 3001, a stop detecting unit 3002, an insufficiency output unit 3003, an initial calibration unit 3004, a wheel-rotation-linked LPF unit 3005, an adding unit 3006, an adding unit 3007, an inverse ripple torque processing unit 3008, a smoothed torque processing unit 3009, an adding unit 3010, a shift processing unit 3011, an assist ratio upper limit derating unit 3012, a post-limitation assist ratio output unit 3013, and a smoothing rate determining unit 3014.

The zero detecting unit 3001 outputs a detection signal, which goes on when zero appears in the pedal input torque value from the torque input unit 1027, to the insufficiency output unit 3003, and outputs a detection signal, which goes off when other than zero appears in the pedal input torque value from the torque input unit 1027, to the insufficiency output unit 3003. Also, the stop detecting unit 3002 determines whether or not the electrically assisted bicycle 1 has stopped, based on the vehicle speed value from the vehicle speed input unit 1024, and in the event that determination is made that the electrically assisted bicycle 1 has stopped, outputs a stop signal to the insufficiency output unit 3003.

The insufficiency output unit 3003 has a counter, and upon receiving a detection signal which is on, from the zero detecting unit 3001, decrements the count value of the counter by 1. Further, upon receiving a stop signal from the stop detecting unit 3002, the insufficiency output unit 3003 loads "32" to the counter. The counter value is then divided by "32" to calculate the loss rate, which is output to the initial calibration unit 3004. Note that "32" is but an example of the number of samples for one cycle of pedal input torque (equivalent to half a turn of the pedals), and may be another value instead.

The initial calibration unit 3004 calculates an initial calibration torque value by multiplying the pedal input torque value by the loss rate from the insufficiency output unit 3003, and outputs this to the adding unit 3006.

Figure 7:
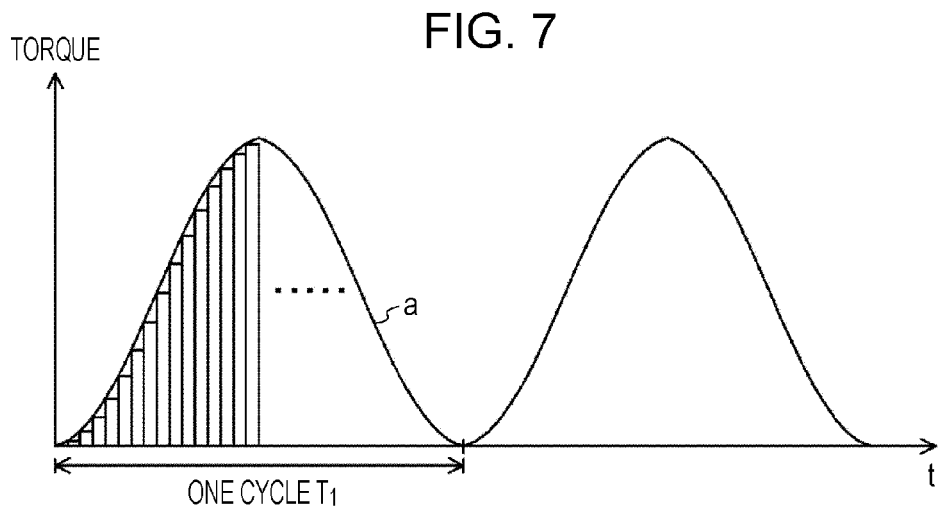
FIG. 7 is a diagram for describing smoothing processing.
Figure 8:
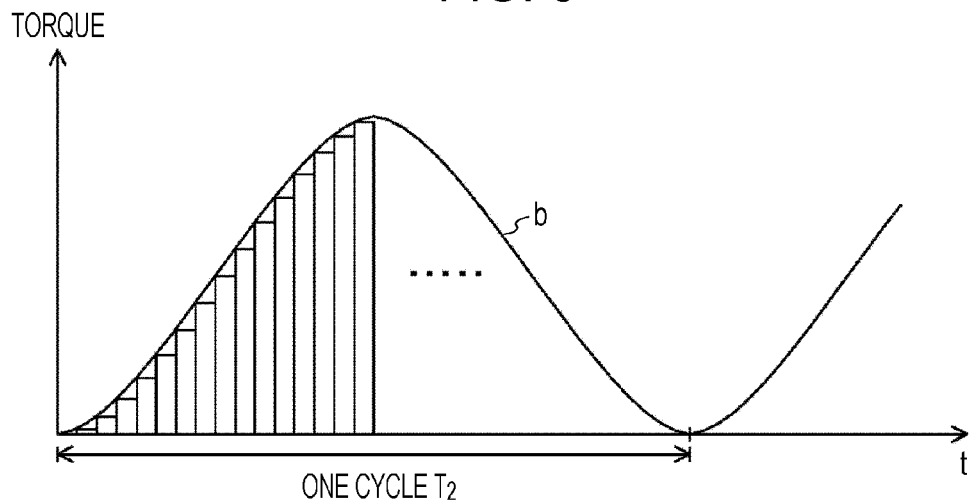
FIG. 8 is a diagram for describing smoothing processing.

Further, the wheel-rotation-linked LPF unit 3005 performs smoothing processing as to pedal input torque $t_0$. While there are various ways of performing smoothing processing, moving average or weighted moving average of medal input torque in a variable cycle equivalent to one cycle of pedal input torque of a variable cycle. In the event that pedal input torque such as illustrated by curve a in FIG. 7 for example, is stably input, the wheel-rotation-linked LPF unit 3005 calculates the moving average or weighted moving average of the pedal input torque at the timings of one cycle $T_1$ of the pedal torque having been divided equally into 32 parts. Also, in the event that pedal input torque such as illustrated by curve b in FIG. 8 is stably input, the wheel-rotation-linked LPF unit 3005 calculates the moving average or weighted moving average of the pedal input torque at the timings of one cycle $T_2$ ($>T_1$) of the pedal torque having been divided equally into 32 parts. Since the pedal input torque varies depending on how the user pedals, the sampling cycle is extended or shortened so as to track this. Detailed configuration of the wheel-rotation-linked LPF unit 3005 will be described later.

The adding unit 3006 adds an initial calibration value $t_2$ from the initial calibration unit 3004 and a smoothing value $t_1$ from the wheel-rotation-linked LPF unit 3005, and outputs a corrected smoothing value $t_3$. Also, the adding unit 3007 performs calculation to subtract the pedal input torque $t_0$ from the smoothing value $t_3$, thereby calculating an inverse ripple torque value $t_4$, which is output to the inverse ripple torque processing unit 3008. The inverse ripple torque processing unit 3008 multiplies a smoothing rate $\alpha_1$ output by the smoothing rate determining unit 3014 by the inverse ripple torque value $t_4$, and calculates an adjusted inverse ripple torque value $t_5$. The smoothing rate $\alpha_1$ may be set to either a positive or negative value.

On the other hand, the assist ratio upper limit derating unit 3012 performs processing to restrict the assist ratio in accordance with the vehicle speed value. For example, (24 km/h−vehicle speed value)/7 is calculated. Further, the post-limitation assist ratio output unit 3013 compares the output value from the assist ratio upper limit derating unit 3012, and assist ratio (e.g., a value from 0 to 2) that is either present or set from the operation panel 106 or the like, and outputs the smaller value.

The smoothed torque processing unit 3009 multiples the corrected smoothing value $t_3$ from the adding unit 3006 by an output value $\alpha_2$ from the post-limitation assist ratio output unit 3013, and calculates an adjusted smoothing value $t_6$.

The adding unit 3010 adds the adjusted inverse ripple torque value $t_5$ from the inverse ripple torque processing unit 3008 and the adjusted smoothing value $t_6$ from the smoothed torque processing unit 3009, and outputs to the shift processing unit 3011. The shift processing unit 3011 divides the output $t_7$ of the adding unit 3010 with a preset gear ratio, thereby calculating the assist torque value. In the event that the current gear ratio can be obtained from sensors or the like, that value may be used.

Figure 9:
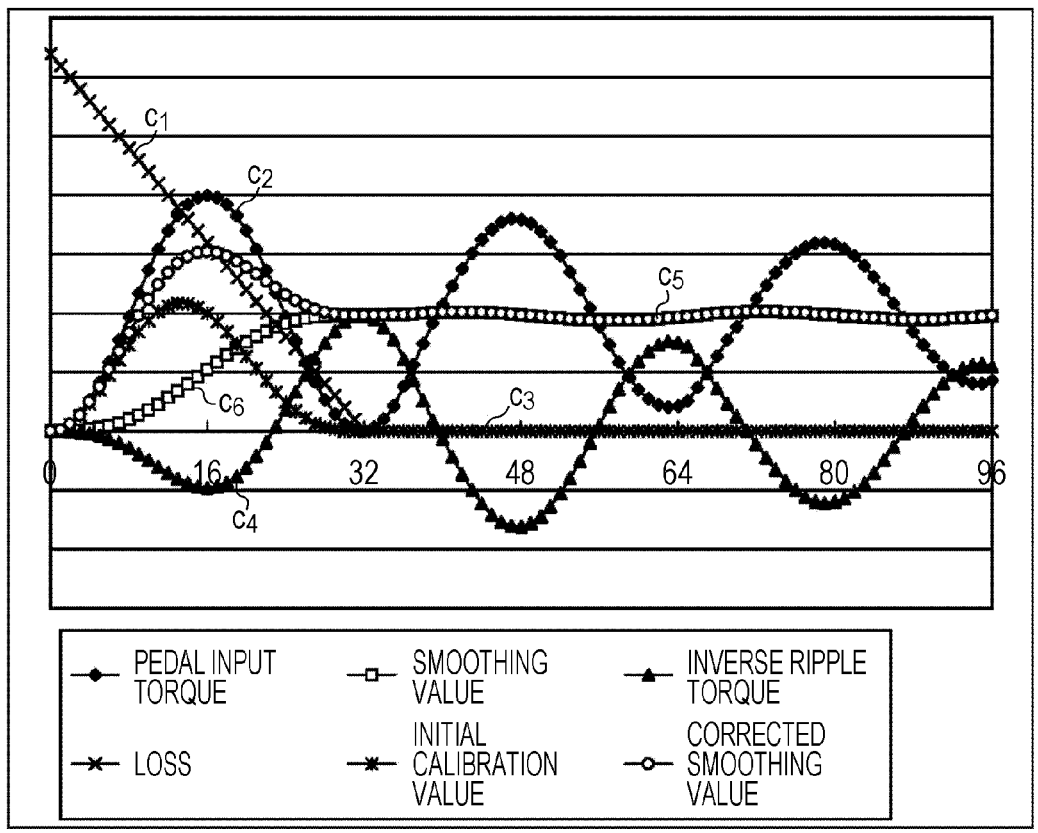
FIG. 9 is a waveform diagram for describing calculating at the driving torque target calculating unit.
Figure 10:
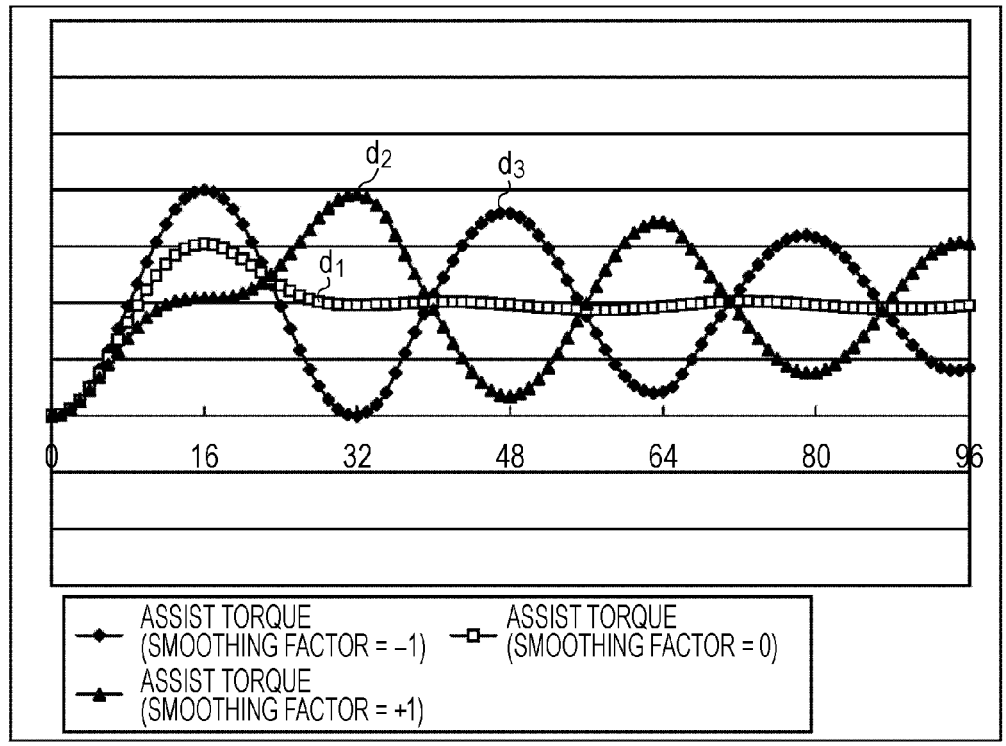
FIG. 10 is a waveform diagram for describing calculating at the driving torque target calculating unit.

To summarize the above-described is as follows.

corrected smoothing value $t_3$=smoothing value $t_1$+initial calibration value $t_2$ inverse ripple torque value $t_4$=corrected smoothing value $t_3$−pedal input torque $t_0$ adjusted inverse ripple torque value $t_5$=inverse ripple torque value $t_4 * \alpha_1$ adjusted smoothing value $t_6$=corrected smoothing value $t_3 * \alpha_2$ $t_7 = t_5 + t_6$ FIGS. 9 and 10 schematically illustrate a wave form for describing the contents of calculation of the drive torque target calculating unit 1203. The horizontal axis in FIG. 3 represents time, and the vertical axis represents torque value for other than straight line $c_1$ and represents loss for straight line $c_1$. Straight line $c_1$ represents loss, which is initially 100%, and gradually drops to 0% as the electrically assisted bicycle 1 begins to travel. On the other hand, pedal input torque is represented by curve $c_2$, and is an undulating curve. The initial calibration unit 3004 multiples the loss by the pedal input torque $t_0$ and calculates the initial calibration value $t_2$, as illustrated with curve $c_3$, as described above. When the loss reaches 0% the initial calibration value $t_2$ also becomes 0, which is shown. Also, the smoothing value $t_1$ which is the output from the wheel-rotation-linked LPF unit 3005 is represented by curve $c_6$. Accordingly, the corrected smoothing value $t_3$ is smoothing value $t_1$+initial calibration value $t_2$, which is curve $c_5$. On the other hand, the inverse ripple torque value $t_4$ is smoothing value $t_3$−pedal input torque $t_0$, and accordingly is presented by curve $c_4$. That is to say, this indicates the AC component of the inverse polarity of the pedal input torque.

Also, calculating at the inverse ripple torque processing unit 3008 and adding unit 3010 will be described with reference to FIG. 4. We will way that $\alpha_2=1$ here, to simplify description. The horizontal axis in FIG. 4 represents time, and the vertical axis in FIG. 4 represents the torque value. In FIG. 10, the curve $d_1$ is the same as the curve $c_5$ in FIG. 9, with the smoothing rate $\alpha_1$ by which the inverse ripple torque value $t_4$ is multiplied being zero, and the adjusted smoothing value $t_6$ being the assist torque value. By using such a curve $d_1$ as the assist torque value, torque that is about the same will be output from the motor 105.

The average assist power by the motor 105 is proportionate to the average driving torque regardless of torque rippling while traveling at the same speed, i.e., is proportionate to the average motor driving current. However, the power consumption is proportionate to the effective value of the current, and in the event that there is rippling, i.e., AC component, current equivalent to that amount is consumed by the motor coil resistance and loss increases, but current equivalent to the rippling is cancelled out and does not contribute to mechanical output as assist power output. Accordingly, the average efficiency of the motor is the highest when driven so that there is not ripple torque and DC torque is output on the average, so driving the motor at an assist torque value such as with curve $d_1$ is efficient.

On the other hand, if we say that smoothing rate $\alpha_1=-1$, this means that the inverse ripple torque value $t_4$ is to be subtracted from the adjusted smoothing value $t_6$, so as indicated by curve $d_3$, an assist torque value similar to the original pedal input torque $t_0$ is obtained. Further, if we say that smoothing rate $\alpha_1=+1$, this means that the inverse ripple torque value $t_4$ is to be added to the adjusted smoothing value $t_6$, so a curve $d_2$ is obtained where inverse polarity rippling to the pedal input torque $t_0$ is added to the adjusted smoothing value $t_6$ while the initial torque value is still great.

Thus, appropriately setting the smoothing rate $\alpha_1$ allows various assist torque values to be output.

Note that the above-described calculates are but exemplary, and that results similar to those described above can be obtained by providing a torque mixing unit which performs weighting addition of the pedal input torque and corrected smoothing value by optional coefficients (positive or negative).

Figure 11:
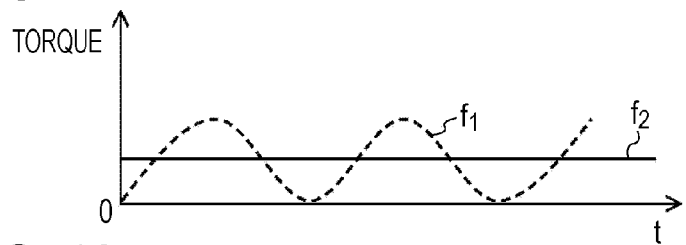
FIG. 11 is a diagram for describing smoothing processing.
Figure 12:
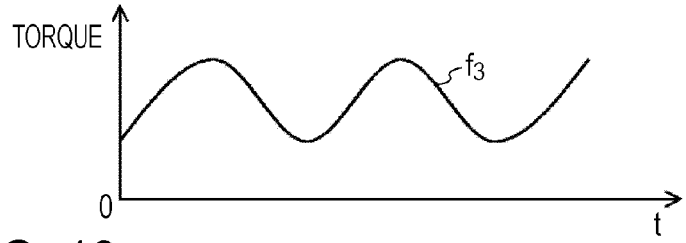
FIG. 12 is a diagram for describing smoothing processing.

For example, if a smoothed assist torque value such as with curve $d_1$ in FIG. 4 is calculated, insufficient pedal pedaling force at the bottom dead center is compensated for during normal driving, and motor peak power is suppressed, which is desirable. As schematically illustrated in FIG. 11 in a case where the assist torque value is such as indicated by straight line $f_2$ and the pedaling force is such as indicated by curve $f_1$, the torque output for the overall electrically assisted bicycle 1 is as illustrated in FIG. 12. That is to say, a curve $f_3$ where the pedaling force curve has shifted upwards by an amount equivalent to that of the assist torque value is obtained. Thus, when the rider pedals strongly, torque is output accordingly, so the sensation of a human pedaling is maintained. This enables assist which is desirable both from human sensation and motor efficiency is enabled.

Figure 13:
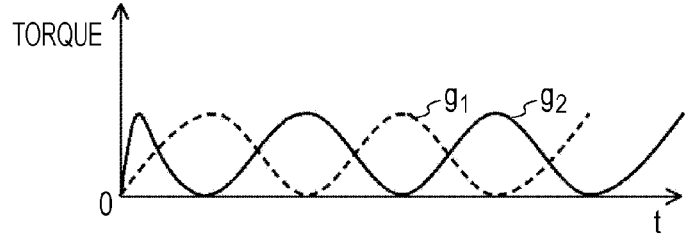
FIG. 13 is a diagram for describing smoothing processing.
Figure 14:
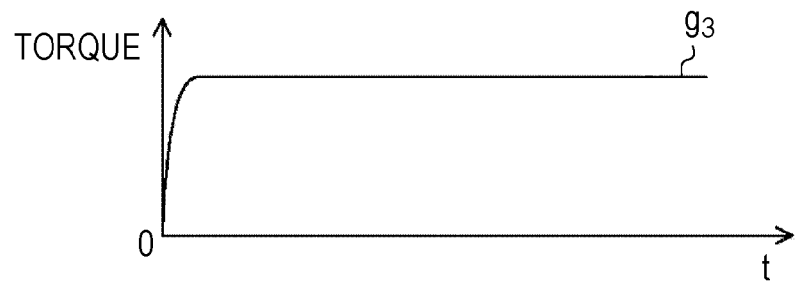
FIG. 14 is a diagram for describing smoothing processing.

On the other hand, when climbing hills, an assist torque value such as illustrated in FIG. 13 for example, is preferable. In FIG. 13, an assist torque value $g_2$ like curve $d_2$ in FIG. 4 is generated as to pedaling force $g_1$. Upon the pedaling force $g_1$ and assist torque value $g_2$ being added as illustrated in FIG. 14, a smooth straight line $g_3$ is the torque output for the overall electrically assisted bicycle 1. While a very great torque is required to climb hills, legal constraints prevent motor output greater than input pedaling force. Accordingly, appropriating assist torque corresponding to the input pedaling force at the bottom dead center where human force is the most difficult to apply yields an overall smooth torque output. In this way, smooth driving can be achieved by assistance even in a state where the bicycle is about to stall at bottom dead center when climbing hills.

In this way, when climbing hills, in the event that there is ripples in driving torque in the total of pedaling force and assist torque, backward force of gravity attempting to pull the bicycle back down the hill is added thereto, so speed rippling occurs in addition to torque rippling. Accordingly, in the event there is torque ripping, the minimum speed is slower even with the same driving being performed on the average, as compared with a case where there is no rippling. A lower minimum speed means that the handlebar stability will drop, the pedals stay around the bottom dead center longer, and since the bicycle is very hard to pedal, the rider tires. Accordingly, an assist torque value undulating such as with curve $g_2$ in FIG. 13 is output to raise torque around the bottom dead center of the pedal, which results in less assist amount being needed, and the power load on the motor is actually alleviated.

Thus, with cases such as climbing hills, smoothing rippling in total torque is more preferable for the human, the motor, and the battery.

Figure 15:
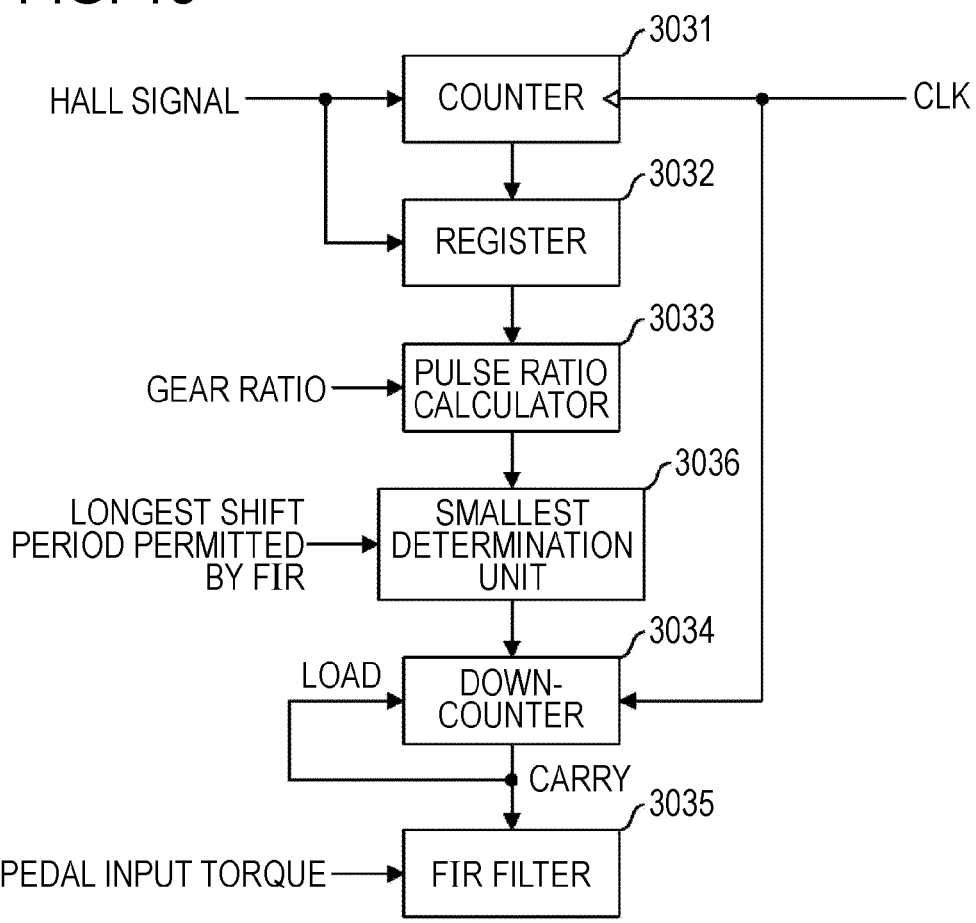
FIG. 15 is a functional block diagram of a wheel-rotation-linked LPF unit.

Next, the details of the wheel-rotation-linked LPF unit 3005 will be described with reference to FIG. 15. The wheel-rotation-linked LPF unit 3005 includes a counter 3031, a register 3032, a pulse ratio calculator 3033, a down-counter 3034, a FIR filter 3035, and a smallest determination unit 3036.

The counter 3031 starts counting a clock CLK from the leading edge of a hall signal from the motor 105 and counts the clock until the next leading edge, and outputs the count value to the register 3032. The register 3032 also hold the count value which the counter 3031 output the predicting time, and outputs the predicting count value to the pulse ratio calculator 3033 at the leading edge of the hall signal for example, and saves the output value from the counter 3031.

With the present embodiment, 64 pulses are generated for two cycles of pedal input torque, and 32 pulses for one cycle. On the other hand, the revolutions of the wheel is pedal revolutions*gear ratio g, and further, the motor makes 20 revolutions with one rotation of the wheel. One rotation of the motor means four pulses (hall pulses) for the hall signals, which means one revolution of the pedal gives g*20*4=80 g hall pulses. Accordingly, the pedal pulse frequency to be generated is a 64/80 g hall pulse frequency. Also, the pedal pulse frequency is a 64/80 g hall pulse frequency. The hall pulse cycle is counted at the counter 3031, so the pedal pulse cycle is obtained by the pulse ratio calculator 3033 multiplying the count value by 80 g/64. Note that in the event that the current gear ratio can be obtained by sensors or the like, that value may be used.

AS described above, the pulse ratio calculator 3033 multiplies the count value by 80 g/64, and the smallest determination unit 3036 compares the output from the pulse ratio calculator 3033 with the longest shift period permitted for the FIR filter 3035 that has been set beforehand, and outputs the smaller to the down-counter 3034. The down-counter 3034 then decrements the pedal-pulse-equivalent-cycle output from the pulse ratio calculator 3033 in clocks. Upon decrementing the pedal-pulse-equivalent-cycle the down-counter 3034 outputs the carry to the FIR filter 3035 as a pedal-equivalent-pulse. Also, the carry output from the down-counter 3034 is loaded and input to the down-counter 3034, so the pedal-pulse-equivalent-cycle which the pulse ratio calculator 3033 has newly output is acquired and decrementing is started.

Note that the longest shift period permitted for the FIR filter 3035, that is input to the smallest determination unit 3036, is set as a pedal-pulse-equivalent-cycle which is markedly slower than a normal driving speed, such as equivalent to 1 km per hour, for example. When driving at a faster speed that this in a normal situation the smallest determination unit 3036 passes through the output from the pulse ratio calculator 3033 without change. However, in a case of low speed of 1 km per hour or slower, a pedal-pulse-equivalent-cycle equivalent to the 1 km per hour is selectively output, and pedal-equivalent-pulses of 1 km per hour or faster are constantly output from the down-counter 3034. This prevents cases of the FIR filter 3035 holding or abnormally great delay being generated particularly when stopped or near to stopped.

Repeating such operations results in 32 pulses at one cycle of the pedal being input in accordance with rotations of the wheel, i.e., of the motor 105, as the shift clock of the FIR filter 3035.

Figure 16:
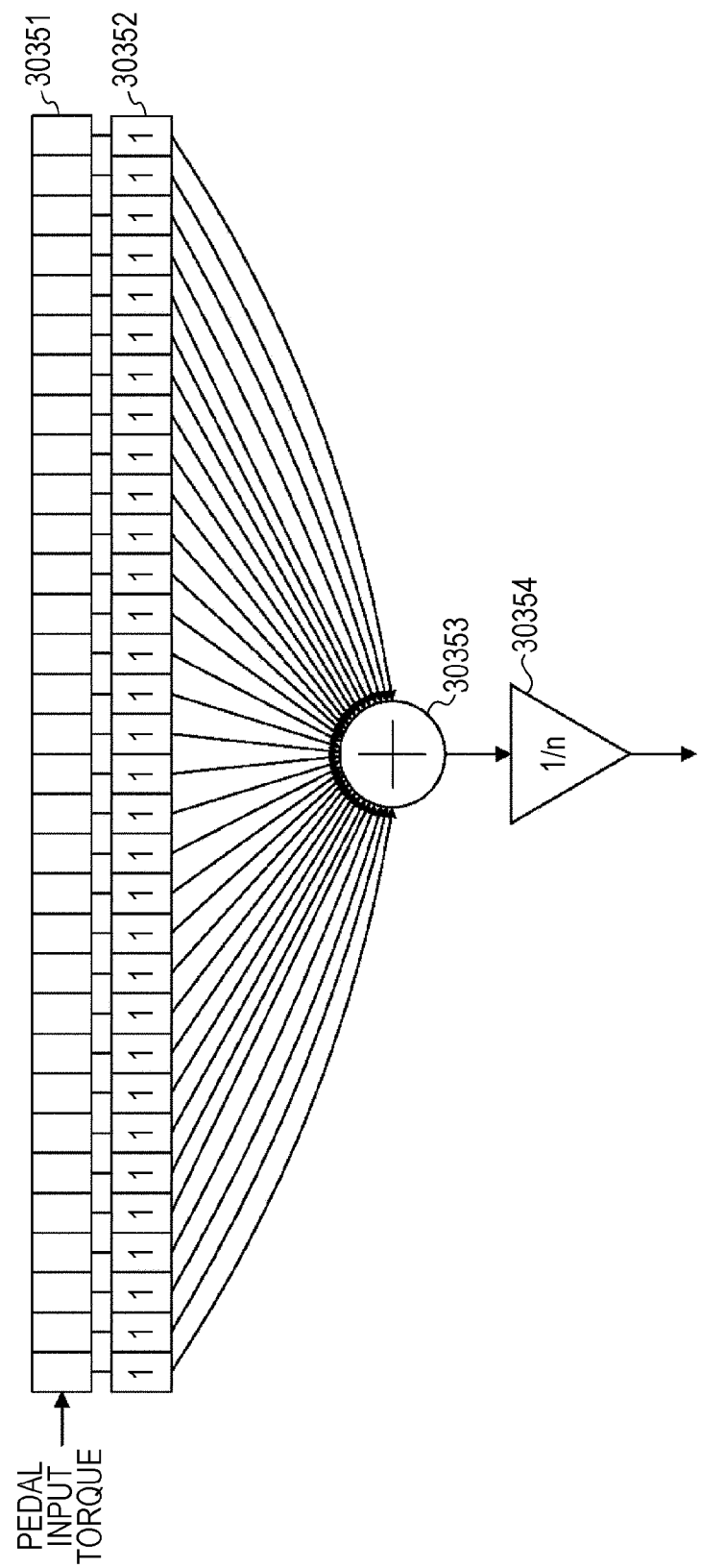
FIG. 16 is a diagram illustrating a configuration example of a FIR filter.

FIG. 16 illustrates a configuration example of the FIR filter 3035 according to the present embodiment. The FIR filter 3035 illustrated in FIG. 16 includes, for example, a shift register 30351 which, upon pedal input torque values sampled each pedal-equivalent-pulse being input from the left sequentially, right-shifts for each pedal-equivalent-pulse, a multiplying unit 30352 which multiples with tap coefficient values of each tap, an adding unit 30353, and a multiplying unit 30354 which performs $\frac{1}{32}$ (n=32) to obtain an average.

The shift register 30351 right-shifts the value of each tap for each pedal-equivalent-pulse, and also outputs the value of each tap to the multiplying unit 30352, where the multiplying unit 30352 multiples by a preset tap coefficient and outputs to the adding unit 30353. The adding unit 30353 adds all values of the multiplying unit 30352, and outputs to the multiplying unit 30354. The multiplying unit 30354 multiples the addition results by $\frac{1}{32}$, thereby calculating a moving average. That is to say, the moving average of one cycle worth of pedal input torque can be calculated following phase transition of the pedal input torque.

Figure 17:
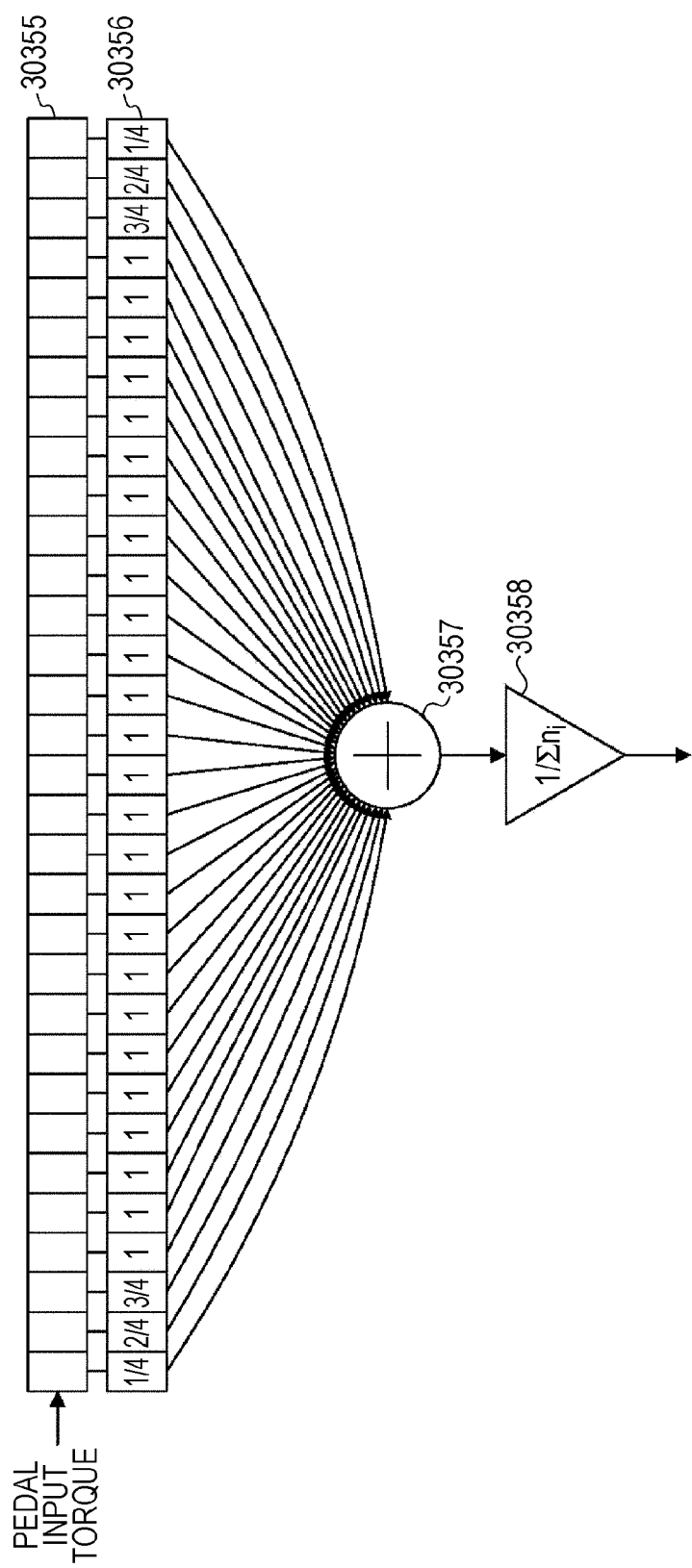
FIG. 17 is a diagram illustrating a configuration example of a FIR filter.

FIG. 17 illustrates another configuration example of the FIR filter 3035 according to the present embodiment. The FIR filter 3035 illustrated in FIG. 17 includes, for example, a shift register 30355 which, upon pedal input torque values sampled each pedal-equivalent-pulse being sequentially input from the left, right-shifts for each pedal-equivalent-pulse, a multiplying unit 30356 which multiples with tap coefficient values of each tap, an adding unit 30357, and a multiplying unit 30358 which divides by tap coefficient summation $\Sigma_i n_i$ (where $n_i$ represents tap coefficients).

While the basic operations are the same as with that illustrated in FIG. 16, there are portions where the tap coefficients are not one. The pedal input torque range (i.e., window) cut out by the shift register 30355 is determined by the pedal-equivalent-pulses generated as described above, but there are cases that this range is offset from one cycle worth of pedal input torque, for some reason. Accordingly, tap coefficients of values smaller than the tap coefficients at other portions are set at both edges of the window, to alleviate effects of offset. In the example in FIG. 17, values of $\frac{1}{4}$, $\frac{2}{4}$, and $\frac{3}{4}$ are set from the edges of the window toward the middle. Setting of these values is optional, and for example, $\frac{1}{5}$, $\frac{2}{5}$, $\frac{3}{5}$, and $\frac{4}{5}$ may be set. Alternatively, an arrangement may be made where the values of the tap coefficients are not changed linearly but other values are used such as following a curve (e.g., a curve which increases as a saturation curve).

Thus, weighted moving average for one cycle worth of pedal input torque can be calculated following the phase transition of the pedal input torque.

Note that similar functions may be realized with another filter such as an IIR (Infinite impulse response) filter or the like, instead of a FIR filter.

Further, the smoothing rate determining unit 3014 may set the above-described smoothing rate, in accordance with the assist ratio set from the operation panel 106, for example. As described with reference to FIGS. 9 through 14, in the event that the rider needs great assist, assist like inverse phase of the pedal input torque is preferable, as indicated with curve $d_2$ in FIG. 4. That is to say, the smoothing rate is preferably raised, i.e., made to near +1, so that the total torque of pedaling force and assist torque is smoothed. Accordingly, in the event of changing the smoothing rate in accordance with the assist ratio, the smoothing rate may be set from the assist ratio following curves illustrated in FIG. 18 or 19, for example. In the examples in FIGS. 18 and 19, the horizontal axis represents the assist ratio, and the vertical axis represents the shifting rate. In the example in FIG. 18, the smoothing rate is left at 0 from assist ratio 0 to 1, and the assist torque is left flat. When the assist ratio exceeds 1, the smoothing rate is raised from 0 to 1 linearly until the assist ratio becomes 2. Accordingly, when more assist is necessary, the smoothing rate is changed so that the total torque of the pedaling force and assist torque is smoothed.

Figure 19:
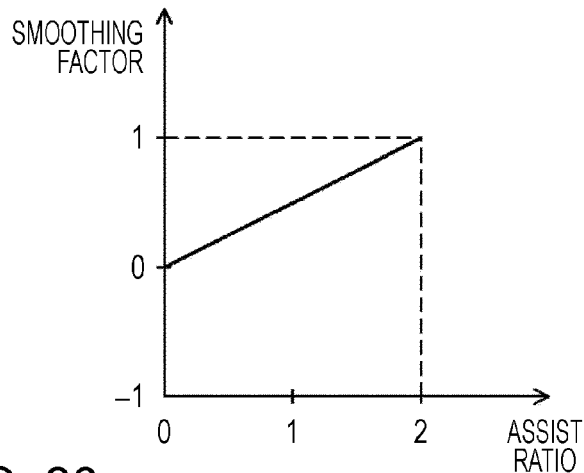
FIG. 19 is a diagram illustrating an example of performing setting of smoothing rate in accordance with assist ratio.

On the other hand, with the example in FIG. 19, an example is shown where the smoothing rate linearly increases from 0 to 1 when if the assist rate increase, so that the total torque of the pedaling force and assist torque is smoothed gradually in accordance to need of assist. Alternatively, the smoothing rate may be non-linearly increased in accordance with increase in the assist ratio.

Figure 18:
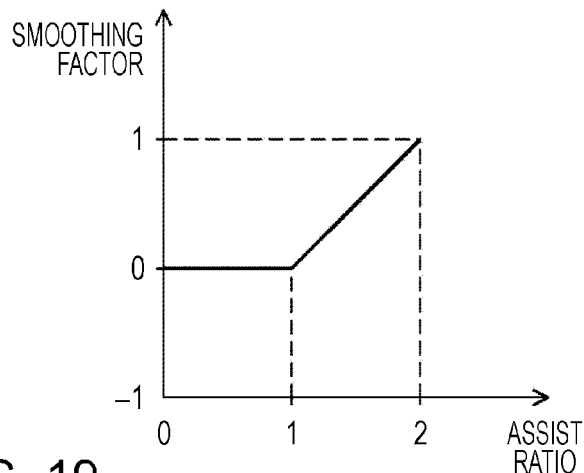
FIG. 18 is a diagram illustrating an example of performing setting of smoothing rate in accordance with assist ratio.

FIGS. 18 and 19 describe an example regarding the relation between assist ratio and smoothing rate, but the relation between suitable assist torque value and vehicle speed is great, as mentioned with regard to FIGS. 11 through 14. Accordingly, a configuration for deciding the assist torque value with the vehicle speed value processed, will be illustrated.

Figure 20:
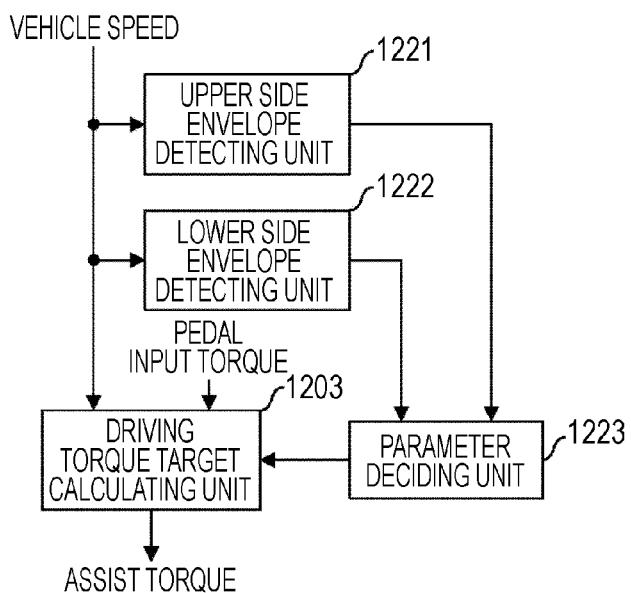
FIG. 20 is a diagram illustrating an example of decoding assist torque value in accordance with vehicle speed.

FIG. 20 illustrates a configuration example of deciding assist ratio and smoothing rate in accordance with vehicle speed, as a configuration example to decide assist torque value in accordance with vehicle speed. With this configuration, an upper side envelope detecting unit 1221, a lower side envelope detecting unit 1222, and a parameter deciding unit 1223, have been added to the functional block diagram illustrated in FIG. 5. The upper side envelope detecting unit 1221 detects the upper side envelope of vehicle speed having rippling, and outputs a vehicle speed value equivalent to the upper side envelope to the parameter deciding unit 1223. The lower side envelope detecting unit 1222 detects the lower side envelope of vehicle speed having rippling, and outputs a vehicle speed value equivalent to the lower side envelope to the parameter deciding unit 1223. The parameter deciding unit 1223 decides the assist ratio and smoothing rate for example, with the following processing, and outputs to the drive torque target calculating unit 1203. The drive torque target calculating unit 1203 calculates the assist torque value using the output value from the parameter deciding unit 1223 as the assist ratio and smoothing rate in the functional block diagram illustrated in FIG. 6. In this case, the smoothing rate determining unit 3014 is not used.

Note that here, there may be cases of using the lower side envelope detecting unit 1222 alone, or of using the upper side envelope detecting unit 1221 and the lower side envelope detecting unit 1222.

Figure 21:
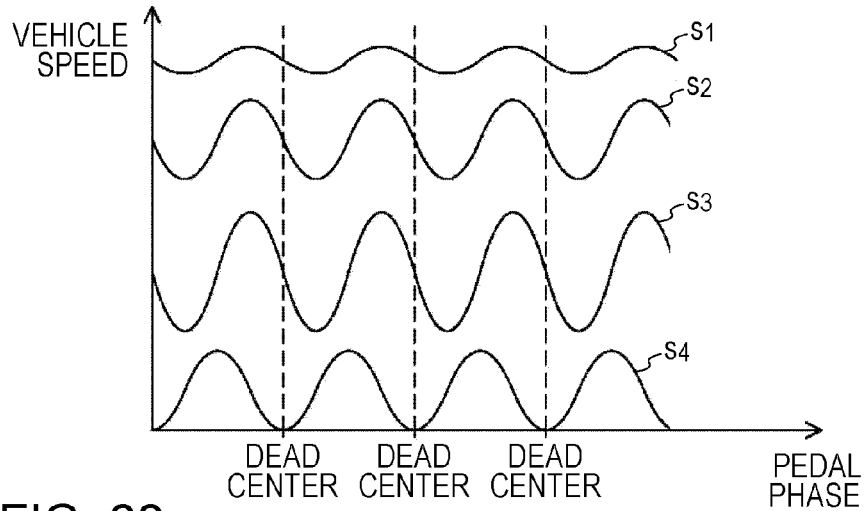
FIG. 21 is a diagram representing a relation between vehicle speed and pedal phase.
Figure 22:
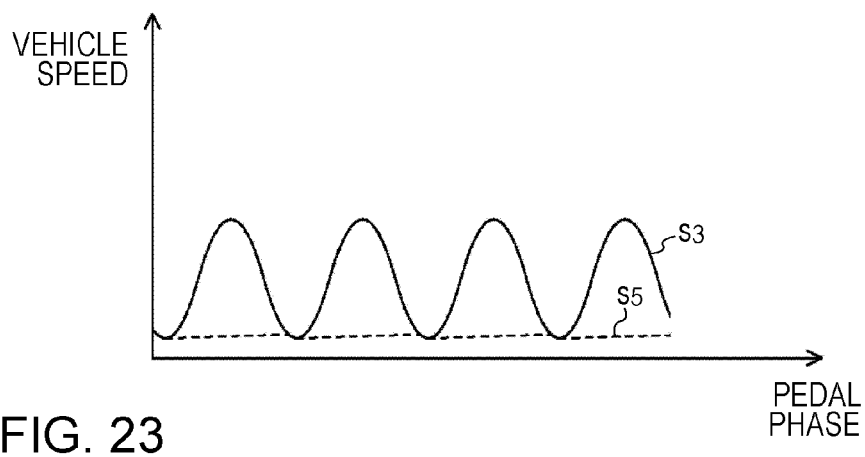
FIG. 22 is a diagram for describing detection of a lower side envelope.

Next, processing according to the configuration illustrated in FIG. 20 will be described with reference to FIGS. 21 through 25. FIG. 21 is a diagram illustrating the relation between vehicle speed (also called instant vehicle speed) and pedal phase. Note that, the cycle of pedal input torque generally becomes longer when climbing hills, while the cases described below will be described with the phase transition of pedal input torque being generally constant, as indicated by curve $s_4$.

For example when the electrically assisted bicycle 1 is driving on flat terrain, the vehicle speed is fast, and the ripples are small curves, as indicated by curve $s_1$. On the other hand, when climbing, the vehicle speed is lower than when on flat terrain, and the ripples exhibit greater curves, as indicated by curve $s_2$. For steep climbs, the vehicle speed is even lower, and the ripples are greater.

Thus, the driving state is manifested in vehicle speed change, so the driving state can be estimated by extracting vehicle speed change appropriately. Accordingly, assist ratio and smoothing rate can be set according to driving state.

Specifically, as illustrated in FIG. 21 cases change from those with small vehicle speed ripples to those that are great, so the lower side envelope of the vehicle speed wave form (also called lower speed side envelope) can be detected and employed as vehicle speed change features. The lower side envelope is also estimated at the time of starting off, so an arrangement where only the lower side envelope is detected will work. The lower side envelope is an envelope curve connecting the minimum points of vehicle speed ripples, as indicated with dotted line $s_5$ in FIG. 22, and can be detected with a known method.

Figure 23:
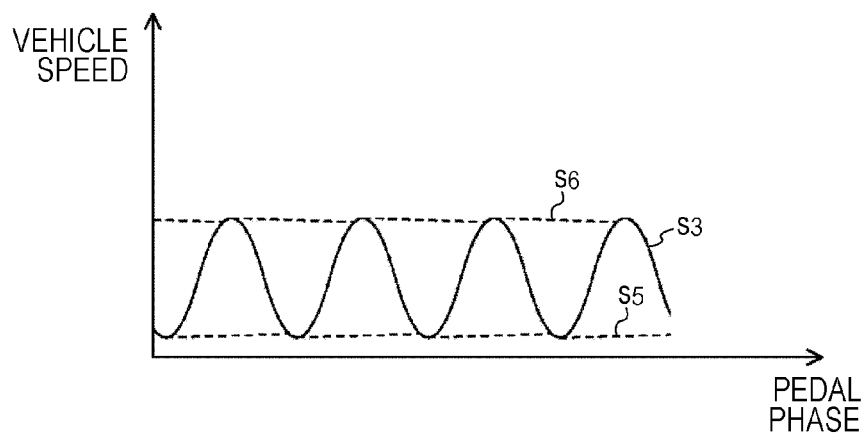
FIG. 23 is a diagram for describing detection of the lower side envelope and an upper side envelope.

On the other hand, as can be seen in FIG. 21, in the event that the climb is steep, rippling in vehicle speed becomes great, so the difference between the upper side envelope and lower side envelope becomes great. More specifically, as illustrated in FIG. 23, an arrangement may be used where a lower side envelope $s_5$ of an envelope curve connecting minimum points of speed ripples and upper side envelope $s_6$ of an envelope curve connecting maximum points of speed ripples are detected, and used as speed change features according to a ratio calculated by lower side envelope value/upper side envelope value, for example.

Figure 24:
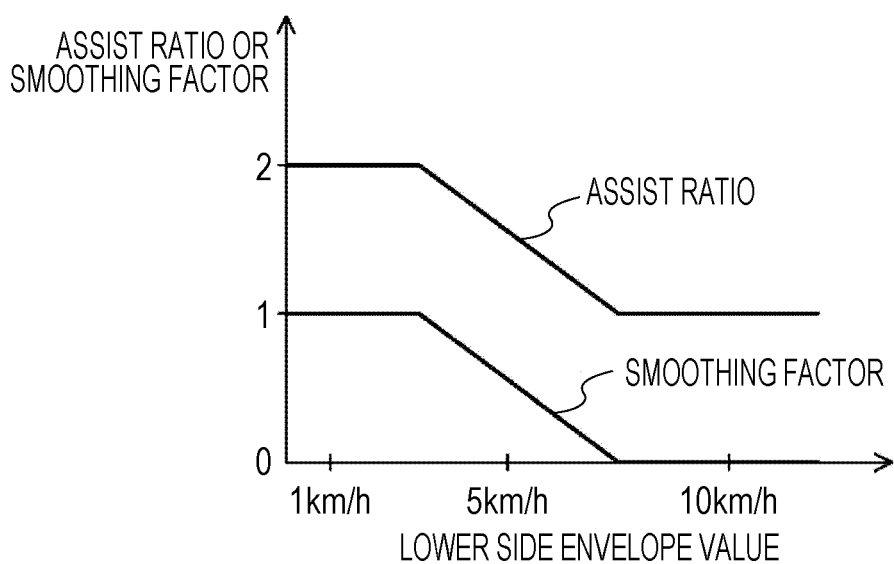
FIG. 24 is a diagram for deciding parameters.

In the event of using the lower side envelope alone, the parameter deciding unit 1223 calculates a smoothing rate and assist ratio corresponding to the lower envelope value, following a curve such as illustrated in FIG. 24, for example. Note that only the smoothing rate or assist ratio may be used. That is to say, an arrangement may be made where only the assist ratio is used. In the event of using only the assist ratio, a smoothing rate corresponding to the assist ratio may be used with a curve such as illustrated in FIGS. 18 and 19. Further, an arrangement may be made where the assist ratio is decided by a different method, and only the smoothing rate is used.

In the example in FIG. 24, the horizontal axis represent the lower side envelope value, and the vertical axis represents the assist ratio or smoothing rate. In this example, at the time of low speeds, the smoothing rate and assist ratio are increase as compared to when at high speeds, and the smoothing rate and assist ratio is gradually lowered as the lower side envelope value increases, so as to become a constant value when the lower side envelope value increased to a certain degree (approximately 7.5 km/h in the example in FIG. 24).

Thus, the assist increases when climbing, and further as illustrated in FIG. 14, when driving on flat terrain the assist torque is driven so as to be constant such that the total torque of the pedaling force and assist torque becomes flat.

Figure 25:
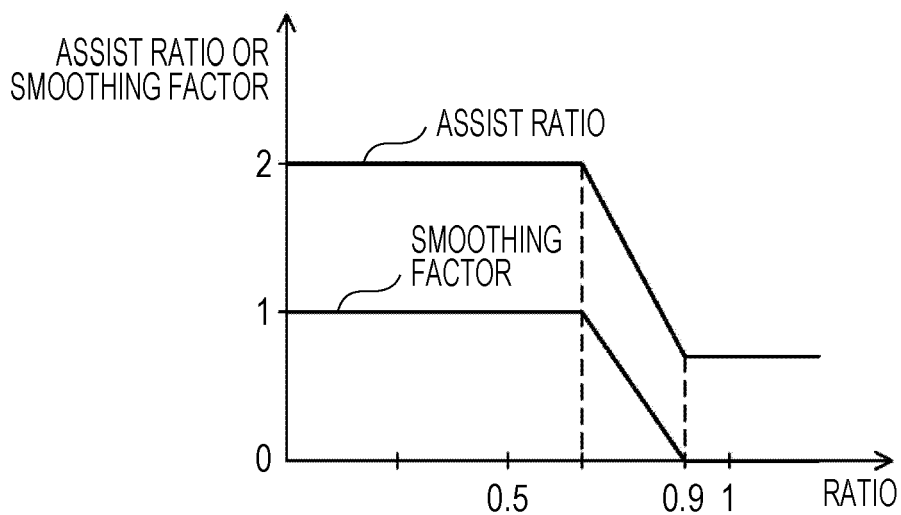
FIG. 25 is a diagram for deciding parameters.

Further, in the event of using both the upper side envelope and lower side envelope, the parameter deciding unit 1223 calculates the smoothing rate and assist ratio following a curve such as illustrated in FIG. 25, for example. In the example in FIG. 25, the horizontal axis illustrates the value of lower side envelope/upper side envelope, and the vertical axis illustrates the smoothing rate or assist ratio. In the example in FIG. 25, as illustrated in FIG. 21 great assist is preferable when lower side envelope/upper side envelope is small, and the assist can be decreased as this increases 1, so the assist ratio is set to "2" and the smoothing rate to "1" until the lower side envelope/upper side envelope becomes a certain value (e.g., 0.6). When the lower side envelope/upper side envelope exceeds the certain value, the assist ratio and smoothing rate are gradually lowered, and when reaching around 0.9 for example, the assist ratio and smoothing rate become a constant value again.

This curve is only an example, and other curves may be used.

Also, at the time of starting out as described above, only the lower side envelope is detected, so an arrangement may be made wherein, for example, the value calculated in FIG. 24 and the value calculated in FIG. 25 (if calculated) are compared, and the greater value is used.

Other Embodiments

Figure 26:
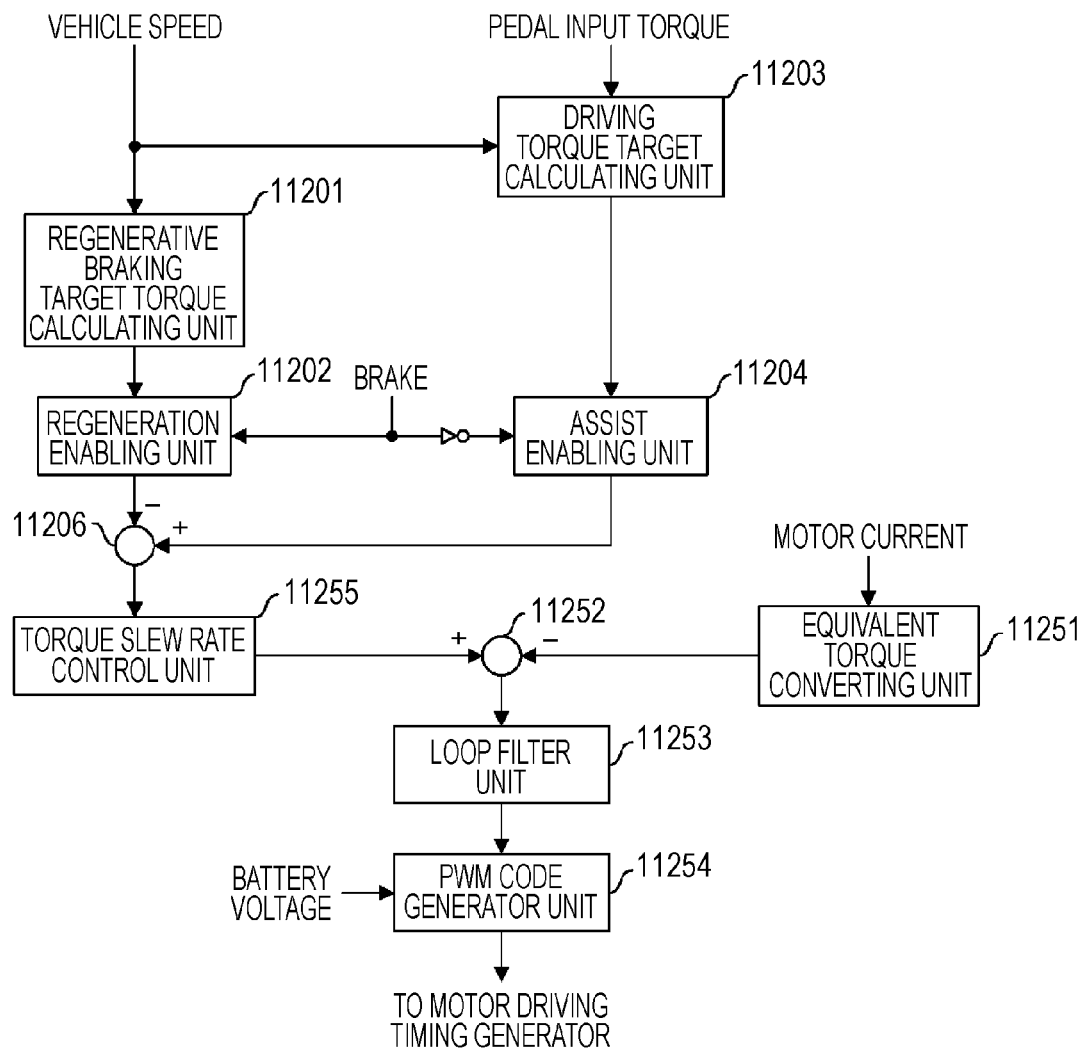
FIG. 26 is a functional block diagram for describing another embodiment.

While an example has been illustrated above where the drive torque target calculating unit 1203 is applied to feed forward control, but the drive torque target calculating unit 1203 can be used with feedback control as well. A functional block diagram of the calculating unit 1021 in such as case is illustrated in FIG. 26.

The calculating unit 1021 according to the present embodiment includes a regenerative braking target torque calculating unit 11201, a regeneration enabling unit 11202, a driving torque target calculating unit 11203, an assist enabling unit 11204, an adding unit 11206, a torque slew rate control unit 11255, an equivalent torque converting unit 11251, an adding unit 11252, a loop filter unit 11253, and a PWM code generator unit 11254.

The vehicle speed value from the vehicle speed input unit 1024 and pedal torque value from the torque input unit 1027 are input to the driving torque target calculating unit 11203, and the assist torque value is calculated. The calculation contents of the driving torque target calculating unit 11203 is the same as with the drive torque target calculating unit 1203.

Also, the regenerative braking target torque calculating unit 11201 calculates a regenerative braking target torque value following a preset curve for example, in accordance with the vehicle speed value from the vehicle speed input unit 1024. This curve is a curve representing a relation indicating an inverse polarity from the vehicle speed value and an absolute value less than or half of the absolute value of the vehicle speed value (less than or half could also mean, for example, a few percentage points over half the value). In this way enables the performance of a reasonably efficient regeneration at any speed. This processing is not the primary purport of the present embodiment, so further description will be omitted.

With the present embodiment, upon an input signal representing that braking is present is input from the brake input unit 1028, the regeneration enabling unit 11202 outputs the regenerative target torque value from the regenerative braking target torque calculating unit 11201 to the adding unit 11206. Otherwise, a zero is output. On the other hand, in the event that an input signal indicating no braking is input from the brake input unit 1028, the assist enabling unit 11204 outputs an assist torque value from the driving torque target calculating unit 11203. Otherwise, a zero is output.

The adding unit 11206 either inverts the polarity of the regenerative target torque value from the regeneration enabling unit 11202 and outputs, or outputs the assist torque value from the assist enabling unit 11204 without change. Hereinafter, the assist torque value and regenerative target torque value will be referred to simply as "target torque value" to simplify description.

The torque slew rate control unit 11255 subjects the target torque value from the adding unit 11206 to well-known slew rate restricting processing, and outputs the processing results to the adding unit 11252.

On the other hand, the equivalent torque converting unit 11251 subjects a value equivalent to the motor current from the current detection unit 1023, to processing to convert to a torque equivalent value, and outputs the processing results to the adding unit 11252. The adding unit 11252 subtracts the output from the equivalent torque converting unit 11251 from the output from the torque slew rate control unit 11255, and outputs the calculation results to the loop filter unit 11253. The loop filter unit 11253 subjects the output from the adding unit 11252 to integration processing, and outputs the processing results to the PWM code generator unit 11254. The PWM code generator unit 11254 multiples the output from the loop filter unit 11253 by a battery voltage/reference voltage (e.g., 24 V) from the AD input unit 1029, and generates PWM code. The PWM code is output to the motor drive timing generator unit 1026.

Thus, the advantages of the drive torque target calculating unit 1203 described above with feedback control can be obtained in the same way.

While embodiments of the present invention have been described above, the present invention is not restricted to these. For example, the functional block diagrams described above have functional blocks divided for the sake of description, so actual circuit configurations may be different, and may not match program module configurations when being realized by a program. Further, specific calculation methods to realize the functions previously described are many in number, and any of these may be implemented.

Also, a portion of the calculating unit 1021 may be realized with a specialized circuit, and the functions described previously may also be realized by executing a program with a microprocessor.

Also, with the above-described embodiments, an example of calculation has been illustrated where the pedal input torque is multiplied by the loss without change, but an arrangement may be made where the pedal input torque is multiple by a function f(x) of the loss x. Further, a modification may be made where the output of the wheel-rotation-linked LPF unit 3005 is multiplied by a function g(x) of the loss x.

What is claimed is:

1. A motor driving control apparatus comprising:
a memory; and
a processor configured to use the memory and execute a process, the process comprising:
executing smoothing processing using values of pedal input torque, which is inputted from a pedal of an electrically assisted bicycle, at a plurality of points to calculate a first smoothed torque value;
calculating a rate of points at which the pedal input torque is zero among the plurality of points;
first performing calculation processing of mixing the first smoothed torque value and the pedal input torque in accordance with the rate to calculate assist torque; and
second performing processing to drive a motor of the electrically assisted bicycle using the assist torque.

2. The motor driving control apparatus according to claim 1, wherein the smoothing processing is performed by a filter that calculates a moving average or weighted moving average of the values of the pedal input torque within a period corresponding to one cycle of the pedal input torque, as the first smoothed torque value.

3. The motor driving control apparatus according to claim 2, wherein the filter is a FIR (Finite Impulse Response) filter, and wherein values of tap coefficients for the FIR filter, which correspond to both edge portions of the period, are set so as to smoothly change to values of tap coefficients, which correspond to other portions of the period.

4. The motor driving control apparatus according to claim 1, wherein the first performing includes:
performing addition of a second smoothed torque value, which is an addition result of the first smoothed torque value and a value calculated by multiplying the pedal input torque by the rate, and the pedal input torque, with weighting with a positive or negative arbitrary smoothing coefficient value.

5. The motor driving control apparatus according to claim 1, wherein the first performing includes:
calculating an inverse ripple torque by subtracting a value of the pedal input torque from a second smoothed torque value, which is an addition result of the first smoothed torque value and a value calculated by multiplying the pedal input torque by the rate, multiplying the inverse ripple torque by a positive or negative arbitrary smoothing coefficient value, and adding a result of the multiplying and the second smoothed torque value.

6. The motor driving control apparatus according to claim 5, wherein the positive or negative arbitrary smoothing coefficient value is set so as to increase as a pedaling assist ratio being set rises.

7. The motor driving control apparatus according to claim 1, wherein the smoothing processing unit changes comprises changing a sampling timing of the pedal input torque according to a speed of the electrically assisted bicycle.

8. A motor driving control apparatus comprising:
a memory; and
a processor configured to use the memory and execute a process, the process comprising:
calculating, for a period corresponding to one cycle of a torque request whose cycle is variable, a moving average or weighted moving average of the torque request to generate a smoothed torque request;
performing calculation processing using the smoothed torque request and the torque request to calculate a target torque corresponding to the torque request; and
performing processing to drive a motor in a vehicle using the target torque.

9. The motor driving control apparatus according to claim 8, wherein the calculating is performed by a FIR filter, and wherein values of tap coefficients for the FIR filter, which correspond to both edge portions of the period, are set so as to smoothly change to values of tap coefficients, which correspond to other portions of the period.

10. The motor driving control apparatus according to claim 8, wherein the calculating comprises changing a sampling timing of the torque request in accordance with pulse signals generated in accordance with rotations of the motor.

11. A motor driving control apparatus comprising:
a memory; and
a processor configured to use the memory and execute a process, the process comprising:
generating a smoothed torque request by smoothing torque requests;
weighting the smoothed torque request with a first positive arbitrary coefficient value, weighting the torque request with a second positive or negative coefficient value and mixing the weighted smoothed torque request and the weighted torque request; and
performing processing to drive a motor in a vehicle using a target torque that is based on a result of the mixing.

12. The motor driving control apparatus according to claim 11, wherein the process further comprises:
detecting values of a lower side envelope of a vehicle speed which changes over time; and
determining the first positive arbitrary coefficient value and/or the second positive or negative arbitrary coefficient value in accordance with the values of the lower side envelope.

13. The motor driving control apparatus according to claim 11, wherein the process further comprises:
detecting values of a lower side envelope and values of an upper side envelope of a vehicle speed which changes over time; and
determining the first positive arbitrary coefficient value and/or the second positive or negative arbitrary coefficient value in accordance with the values of the lower side envelope and the values of the upper side envelope.

14. The motor driving control apparatus according to claim 11, wherein the weighting comprises changing the first positive arbitrary coefficient value and/or the second positive or negative arbitrary coefficient value in accordance with a pedaling assist ratio.

15. The motor driving control apparatus according to claim 11, wherein the weighing comprises decreasing the second positive or negative arbitrary coefficient value along with increase of a pedaling assist ratio.

16. The motor driving control apparatus according to claim 11, wherein the generating comprises calculating, for a period corresponding to one cycle of a torque request whose cycle is variable, a moving average or weighted moving average of the torque request.

17. The motor driving control apparatus according to claim 16, wherein the calculating is performed by a FIR filter, and wherein values of tap coefficients for the FIR filter, which correspond to both edge portions of the period, are set so as to smoothly change to values of tap coefficients, which correspond to other portions of the period.

18. The motor driving control apparatus according to claim 16, wherein the generating comprises changing a sampling timing of the torque request according to a vehicle speed.

19. A motor driving control apparatus comprising:
a memory; and
a processor configured to use the memory and execute a process, the process comprising:
generating a smoothed torque request by smoothing torque requests;
calculating an inverse ripple torque by subtracting the torque request from the smoothed torque request, multiplying the inverse ripple torque by a positive or negative arbitrary coefficient value, and adding a result of the multiplying and either of the smoothed torque request and a value calculated by multiplying the smoothed torque request by a predetermined value; and
performing processing to drive a motor in a vehicle using a target torque that is based on a result of the adding.

20. The motor driving control apparatus according to claim 19, wherein the process further comprises:
detecting values of a lower side envelope of a vehicle speed which changes over time; and
determining the positive or negative arbitrary coefficient value in accordance with the values of the lower side envelope.

21. The motor driving control apparatus according to claim 19, wherein the process further comprises:
detecting values of a lower side envelope and values of an upper side envelope of a vehicle speed which changes over time; and
determining the positive or negative arbitrary coefficient value in accordance with the values of the lower side envelope and the values of the upper side envelope.

22. The motor driving control apparatus according to claim 19, wherein the calculating comprises changing the positive or negative arbitrary coefficient value in accordance with a pedaling assist ratio.

23. The motor driving control apparatus according to claim 19, wherein the generating comprises second calculating, for a period corresponding to one cycle of a torque request whose cycle is variable, a moving average or weighted moving average of the torque request.

24. The motor driving control apparatus according to claim 23, wherein the second calculating is performed by a FIR filter, and wherein values of tap coefficients for the FIR filter, which correspond to both edge portions of the period, are set so as to smoothly change to values of tap coefficients, which correspond to other portions of the period.

25. The motor driving control apparatus according to claim 23, wherein the generating comprises changing a sampling timing of the torque request according to a vehicle speed.

26. The motor driving control apparatus according to claim 19, wherein the positive or negative arbitrary coefficient value is set so as to increase along with increase of the predetermined value.

* * * * *